United States Patent  
Modani et al.

(10) Patent No.: US 12,198,459 B2  
(45) Date of Patent: Jan. 14, 2025

(54) SYSTEMS FOR GENERATING INDICATIONS OF RELATIONSHIPS BETWEEN ELECTRONIC DOCUMENTS

(71) Applicant: Adobe Inc., San Jose, CA (US)

(72) Inventors: Natwar Modani, Bangalore (IN); Vaidehi Ramesh Patil, Ratnagiri (IN); Inderjeet Jayakumar Nair, Indore (IN); Gaurav Verma, Atlanta, GA (US); Anurag Maurya, Prayagraj (IN); Anirudh Kanfade, Burhanpur (IN)

(73) Assignee: Adobe Inc., San Jose, CA (US)

( * ) Notice: Subject to any disclaimer, the term of this patent is extended or adjusted under 35 U.S.C. 154(b) by 558 days.

(21) Appl. No.: 17/534,744

(22) Filed: Nov. 24, 2021

(65) Prior Publication Data

US 2023/0162518 A1 May 25, 2023

(51) Int. Cl.
*G06K 9/34* (2006.01)
*G06V 30/19* (2022.01)
(Continued)

(52) U.S. Cl.
CPC ...... *G06V 30/413* (2022.01); *G06V 30/19173* (2022.01); *G06V 30/274* (2022.01); *G06V 30/414* (2022.01); *G06V 30/418* (2022.01)

(58) Field of Classification Search
None
See application file for complete search history.

(56) References Cited

U.S. PATENT DOCUMENTS

| 5,465,353 A * | 11/1995 | Hull | G06V 30/40 |
| | | | 707/999.005 |
| 8,290,268 B2 * | 10/2012 | Jain | G06V 30/414 |
| | | | 382/175 |

(Continued)

FOREIGN PATENT DOCUMENTS

CN 111563101 B * 12/2020 ......... G06F 16/2453

OTHER PUBLICATIONS

Jha et al., "Supervised Contrastive Learning for Interpretable Long-Form Document Matching." arXiv preprint arXiv:2108.09190 (2021). (Year: 2021).*

(Continued)

*Primary Examiner* — Feng Niu
(74) *Attorney, Agent, or Firm* — FIG. 1 Patents

(57) ABSTRACT

In implementations of systems for generating indications of relationships between electronic documents, a processing device implements a relationship system to segment text of electronic documents included in a document corpus into segments. The relationship system determines a subset of the electronic documents that includes electronic document pairs having a number of similar segments that is greater than a threshold number. The similar segments are identified using locality sensitive hashing. The electronic document pairs are classified as related documents or unrelated documents using a machine learning model that receives a pair of electronic documents as an input and generates an indication of a classification for the pair of electronic documents as an output. Indications of relationships between particular electronic documents included in the subset are generated based at least partially on the electronic document pairs that are classified as related documents.

20 Claims, 12 Drawing Sheets

(51) Int. Cl.
  *G06V 30/262* (2022.01)
  *G06V 30/413* (2022.01)
  *G06V 30/414* (2022.01)
  *G06V 30/418* (2022.01)

(56) References Cited

U.S. PATENT DOCUMENTS

| | | | | |
|---|---|---|---|---|
| 8,612,203 | B2* | 12/2013 | Foster | G06F 40/45 |
| | | | | 704/4 |
| 9,235,758 | B1* | 1/2016 | Agrawal | G06T 7/11 |
| 10,311,093 | B2* | 6/2019 | Agarwal | G06F 16/9024 |
| 10,346,439 | B2* | 7/2019 | Agarwal | G06F 16/215 |
| 10,552,197 | B2* | 2/2020 | Karve | G06F 11/1448 |
| 10,642,912 | B2* | 5/2020 | Verma | G06Q 50/01 |
| 10,769,484 | B2* | 9/2020 | Zhang | G06V 30/153 |
| 10,977,325 | B2* | 4/2021 | Mitra | G06F 16/24575 |
| 11,501,551 | B2* | 11/2022 | Mukherji | G06V 30/418 |
| 11,881,041 | B2* | 1/2024 | Khan | G06N 20/00 |
| 11,961,094 | B2* | 4/2024 | Eapen | G06V 10/763 |
| 2009/0083023 | A1* | 3/2009 | Foster | G06F 40/45 |
| | | | | 704/3 |
| 2010/0040287 | A1* | 2/2010 | Jain | G06V 30/414 |
| | | | | 382/177 |
| 2015/0205803 | A1* | 7/2015 | Agarwal | G06F 40/194 |
| | | | | 707/739 |
| 2015/0254329 | A1* | 9/2015 | Agarwal | G06F 16/215 |
| | | | | 707/616 |
| 2015/0379341 | A1* | 12/2015 | Agrawal | G06V 30/414 |
| | | | | 382/176 |
| 2018/0052933 | A1* | 2/2018 | Verma | G06F 16/9535 |
| 2018/0189604 | A1* | 7/2018 | Zhang | G06V 30/1916 |
| 2019/0227830 | A1* | 7/2019 | Karve | G06F 9/45558 |
| 2020/0167431 | A1* | 5/2020 | Mitra | G06F 40/30 |
| 2021/0374162 | A1* | 12/2021 | Kirdey | G06F 40/30 |
| 2021/0383109 | A1* | 12/2021 | Mukherji | G06F 18/217 |
| 2022/0019741 | A1* | 1/2022 | Roy | G06F 40/30 |
| 2022/0156756 | A1* | 5/2022 | Eapen | G06Q 30/0185 |
| 2023/0008142 | A1* | 1/2023 | Balderas | G06F 40/58 |
| 2023/0061725 | A1* | 3/2023 | Khan | G06F 16/93 |
| 2024/0086460 | A1* | 3/2024 | Ben Shaul | G06F 16/538 |

OTHER PUBLICATIONS

Niu et al., "Semi-supervised PLSA for Document Clustering," 2010 IEEE International Conference on Data Mining Workshops, Sydney, NSW, Australia, 2010, pp. 1196-1203 (Year: 2010).*
Wikipedia, Spanning tree, published Jul. 6, 2021 (Year: 2021).*
Nath et al., "Locality-sensitive hashing scheme for Bangla news article clustering using bloom filter," 2017 International Conference on Electrical, Computer and Communication Engineering (ECCE), Cox's Bazar, Bangladesh, 2017, pp. 17-21 (Year: 2017).*
Shi et al., "Documents Categorization Based on Bayesian Spanning Tree," 2006 International Conference on Machine Learning and Cybernetics, Dalian, China, 2006, pp. 1072-1075 (Year: 2006).*
Malhotra et al., "Incremental entity fusion from linked documents," 17th International Conference on Information Fusion (FUSION), Salamanca, Spain, 2014, pp. 1-8. (Year: 2014).*
Tolosana et al., "DeepFakes Evolution: Analysis of Facial Regions and Fake Detection Performance." arXiv preprint arXiv:2004.07532 (2020). (Year: 2020).*
"Atlassian Bitbucket", Atlassian [retrieved Sep. 15, 2021]. Retrieved from the Internet <https://bitbucket.org/>., 2008, 10 Pages.
"CR2 docManager", CR2 Technologies Limited [retrieved Sep. 15, 2021]. Retrieved from the Internet <http://www.cr2.in/products/products-docmanager.html>., Jan. 9, 2007, 5 Pages.
"Docsvault", Docsvault—Document Management Software [retrieved Sep. 15, 2021]. Retrieved from the Internet <https://www.docsvault.com/>., 2003, 5 Pages.
"GitHub, Inc.", GitHub, Inc. [retrieved Sep. 15, 2021]. Retrieved from the Internet <https://github.com/>., Apr. 10, 2008, 21 Pages.

"Google Docs", Google LLC [retrieved Sep. 11, 2021]. Retrieved from the Internet <https://www.google.com/docs/about/>., Mar. 9, 2006, 7 pages.
"Google Sheets", Google [retrieved Sep. 15, 2021]. Retrieved from the Internet <https://www.google.com/sheets/about/>., Mar. 9, 2006, 7 Pages.
"Google Slides", Google LLC [retrieved Sep. 11, 2021]. Retrieved from the Internet <https://www.google.com/slides/about/>., Mar. 9, 2006, 7 pages.
"Microsoft Word", Microsoft [retrieved Sep. 15, 2021]. Retrieved from the Internet <https://www.microsoft.com/en-in/microsoft-365/word>., 1983, 8 Pages.
"Open Document Management System", Open Document Management System S.L. [retrieved Sep. 15, 2021]. Retrieved from the Internet <https://www.openkm.com/>., Nov. 2005, 12 Pages.
Alsulam, Bassma S. et al., "Near Duplicate Document Detection Survey", International Journal of Computer Science & Communication Networks vol. 2, No. 2 [retrieved Sep. 14, 2021]. Retrieved from the Internet <https://www.researchgate.net/publication/266005488_Near_Duplicate_Document_Detection_Survey>., Apr. 2012, 5 Pages.
Blondel, Vincent D. et al., "Fast unfolding of communities in large networks", Journal of Statistical Mechanics: Theory and Experiment, vol. 2008 [retrieved Sep. 15, 2021]. Retrieved from the Internet <https://web.mst.edu/~silvestris/teaching/complexnetworks/papers/0803.0476.pdf>., Jul. 25, 2008, 12 pages.
Broder, Andrei Z., "Identifying and Filtering Near-Duplicate Documents", in: 11th Annual Symposium on Combinatorial Pattern Matching [retrieved Sep. 13, 2021]. Retrieved from the Internet <http://static.cs.brown.edu/courses/csci2531/papers/nearduplicate.pdf>., Nov. 7, 2002, 10 Pages.
Carter, J. Lawrence, "Universal classes of hash functions", Journal of Computer and System Sciences, vol. 18, No. 2 [retrieved Sep. 14, 2021]. Retrieved from the Internet <http://citeseerx.ist.psu.edu/viewdoc/download?doi=10.1.1.465.1355&rep=rep1&type=pdf>., Apr. 1979, 7 Pages.
Cho, Kyunghyun et al., "Learning Phrase Representations using RNN Encoder-Decoder for Statistical Machine Translation", Cornell University, arXiv Preprint, arXiv.org [retrieved Jan. 13, 2022]. Retrieved from the Internet <https://arxiv.org/pdf/1406.1078.pdf>., Jun. 3, 2014, 15 pages.
Chowdhury, Abdur et al., "Collection statistics for fast duplicate document detection", ACM Transactions on Information Systems vol. 20 No. 2 [retrieved Sep. 14, 2021]. Retrieved from the Internet <http://ir.cs.georgetown.edu/downloads/p171-chowdhury.pdf>., Apr. 2002, 22 Pages.
Ekbal, Asif et al., "Plagiarism detection in text using Vector Space Model", 2012 12th International Conference on Hybrid Intelligent Systems (HIS) [retrieved Jan. 13, 2022]. Retrieved from the Internet <https://doi.org/10.1109/HIS.2012.6421362>., Dec. 2012, 6 pages.
Elsayed, Tamer et al., "Pairwise Document Similarity in Large Collections with MapReduce", Proceedings of the 46th Annual Meeting of the Association for Computational Linguistics on Human Language Technologies: Short Papers [retrieved Sep. 14, 2021]. Retrieved from the Internet <https://aclanthology.org/P08-2067.pdf>., Jun. 16, 2008, 4 Pages.
Ertl, Otmar, "SuperMinHash—A New Minwise Hashing Algorithm for Jaccard Similarity Estimation", Cornell University, arXiv Preprint, arXiv.org [retrieved Sep. 14, 2021]. Retrieved from the Internet <https://arxiv.org/pdf/1706.05698.pdf>., Jun. 2017, 6 Pages.
Gupta, Deepa et al., "Plagiarism detection in text documents using sentence bounded stop word N-grams", Journal of Engineering Science and Technology vol. 11, No. 10 [retrieved Sep. 14, 2021]. Retrieved from the Internet <http://jestec.taylors.edu.my/Vol%2011%20issue%2010%20October%202016/11_10_4.pdf>., Oct. 2016, 18 Pages.
Hassanian-Esfahani, Roya et al., "Sectional MinHash for near-duplicate detection", Expert Systems with Applications, vol. 99 [retrieved Sep. 14, 2021]. Retrieved from the Internet <https://www.researchgate.net/publication/322414376_Sectional_MinHash_for_Near-Duplicate_Detection>, Jan. 2018, 11 Pages.
Jiang, Jyun-Yu et al., "Semantic Text Matching for Long-Form Documents", WWW'19: The World Wide Web Conference [retrieved Sep. 15, 2021]. Retrieved from the Internet <https://pub-tools-public-

(56) References Cited

OTHER PUBLICATIONS publication-data.storage.googleapis.com/pdf/99357ca2ef0d89250e8d0aea47607fc4c556aa09.pdf>., May 13, 2019, 11 Pages.

Koch, Gregory et al., "Siamese Neural Networks for One-shot Image Recognition", ICML deep learning workshop, vol. 2 [retrieved Sep. 15, 2021]. Retrieved from the Internet <http://www.cs.toronto.edu/~gkoch/files/msc-thesis.pdf>., Jan. 2015, 30 pages.

Le, Quoc et al., "Distributed Representations of Sentences and Documents", International Conference on Machine Learning [retrieved Sep. 15, 2021]. Retrieved from the Internet <http://proceedings.mlr.press/v32/le14.pdf?source=post_page>., May 2014, 9 pages.

Liu, Xin et al., "Document clustering with cluster refinement and model selection capabilities", 25th annual international ACM SIGIR conference on Research and development in information retrieval [retrieved Sep. 14, 2021]. Retrieved from the Internet <https://citeseerx.ist.psu.edu/viewdoc/download?doi=10.1.1.61.5888&rep=rep1&type=pdf>., Aug. 11, 2002, 8 Pages.

Long, Jonathan et al., "Fully Convolutional Networks for Semantic Segmentation", arXiv Preprint [retrieved Sep. 3, 2021]. Retrieved from the Internet <https://arxiv.org/pdf/1411.4038.pdf>., Nov. 14, 2014, 10 pages.

Lv, Yuanhua et al., "Learning to model relatedness for news recommendation", WWW'11: Proceedings of the 20th international conference on World wide web [retrieved Sep. 14, 2021]. Retrieved from the Internet <http://www.xuanhui.me/pub/www11-relatedness.pdf>., Mar. 28, 2011, 10 Pages.

Manning, Christopher D. et al., "The Stanford CoreNLP Natural Language Processing Toolkit", Proceedings of 52nd Annual Meeting of the Association for Computational Linguistics: System Demonstrations [retrieved Sep. 15, 2021]. Retrieved from the Internet <https://aclanthology.org/P14-5010.pdf>., Jun. 2014, 6 Pages.

Mihalcea, Rada et al., "TextRank: Bringing Order into Text", Proceedings of the 2004 Conference on Empirical Methods in Natural Language Processing [retrieved Sep. 15, 2021]. Retrieved from the Internet <https://aclanthology.org/W04-3252.pdf>., Jul. 2004, 8 Pages.

Pagliardini, Matteo et al., "Unsupervised Learning of Sentence Embeddings using Compositional n-Gram Features", arXiv Preprint, Cornell University, arXiv.org [retrieved Sep. 15, 2021]. Retrieved from the Internet <https://arxiv.org/pdf/1703.02507.pdf>., Mar. 7, 2017, 13 pages.

Park, Keunchan et al., "Deep Neural Networks for News Recommendations", CIKM'17: Proceedings of the 2017 ACM on Conference on Information and Knowledge Management [retrieved Jan. 13, 2022]. Retrieved from the Internet <https://doi.org/10.1145/3132847.3133154>., Nov. 6, 2017, 4 pages.

Sanchez-Perez, Miguel A. et al., "The Winning Approach to Text Alignment for Text Reuse Detection at PAN 2014", CLEF 2014 [retrieved Sep. 14, 2021]. Retrieved from the Internet <https://citeseerx.ist.psu.edu/viewdoc/download?doi=10.1.1.658.832&rep=rep1&type=pdf>., Jan. 1, 2017, 8 Pages.

Sherkat, Ehsan et al., "Interactive Document Clustering Revisited: a Visual Analytics Approach", IUI'18: 23rd International Conference on Intelligent User Interfaces [retrieved Jan. 13, 2022]. Retrieved from the Internet <https://doi.org/10.1145/3172944.3172964>., Mar. 5, 2018, 12 pages.

Socher, Richard et al., "Dynamic Pooling and Unfolding Recursive Autoencoders for Paraphrase Detection", NIPS'11: Proceedings of the 24th International Conference on Neural Information Processing Systems [retrieved Sep. 14, 2021]. Retrieved from the Internet <https://nlp.stanford.edu/pubs/SocherHuangPenningtonNgManning_NIPS2011.pdf>., Dec. 12, 2011, 9 Pages.

Theobald, Martin et al., "SpotSigs: robust and efficient near duplicate detection in large web collections", SIGIR '08: Proceedings of the 31st annual international ACM SIGIR conference on Research and development in information retrieval [retrieved Sep. 15, 2021]. Retrieved from the Internet <http://ilpubs.stanford.edu:8090/860/1/2008-10.pdf>., Jul. 20, 2008, 8 Pages.

Weng, Sung-Shun et al., "Using ontology network analysis for research document recommendation", Expert Systems with Applications, vol. 34, No. 3 [retrieved Sep. 14, 2021]. Retrieved from the Internet <https://ur.booksc.eu/book/3078088/861101>., Apr. 1, 2008, 13 Pages.

Xu, Xuhai et al., "Understanding User Behavior For Document Recommendation", WWW '20: Proceedings of The Web Conference [retrieved Sep. 14, 2021]. Retrieved from the internet <https://orsonxu.com/wp-content/uploads/Projects/UserBehaviorDocRed/characterizing_user_behavior_rdl_WWW_camera_ready.pdf>., Apr. 20, 2020, 7 Pages.

Yan, Zichao et al., "Hierarchical attention networks for document classification", Proceedings of the 2016 Conference of the North American Chapter of the Association for Computational Linguistics: Human Language Technologies [retrieved Sep. 15, 2021]. Retrieved from the Internet <https://aclanthology.org/N16-1174.pdf>., Jun. 2016, 10 Pages.

Yang, Xinli et al., "Combining Word Embedding with Information Retrieval to Recommend Similar Bug Reports", 2016 IEEE 27th International Symposium on Software Reliability Engineering (ISSRE) [retrieved Sep. 14, 2021]. Retrieved from the Internet <https://ink.library.smu.edu.sg/cgi/viewcontent.cgi?article=4560&context=sis_research>., Oct. 2016, 12 Pages.

\* cited by examiner

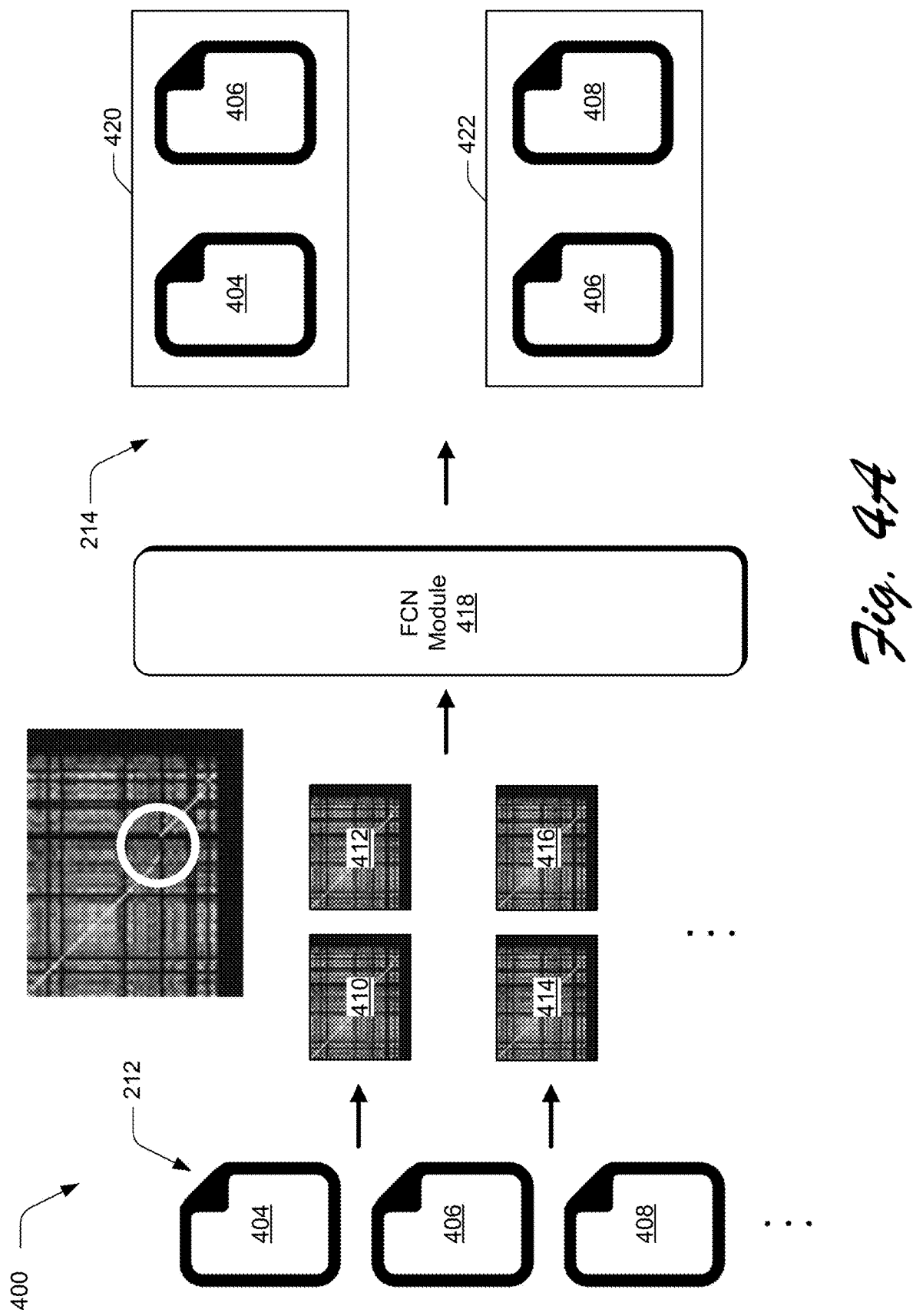

SYSTEMS FOR GENERATING INDICATIONS OF RELATIONSHIPS BETWEEN ELECTRONIC DOCUMENTS

BACKGROUND

The process of creating, editing, and/or revising an electronic document typically produces multiple different drafts or versions of the electronic document. For instance, in a collaborative workflow, contributing entities create many different versions or drafts of various electronic documents as part of the workflow. These various electronic documents are typically stored on storage devices of a server system and often remain on the storage devices consuming storage capacity even after completion of the workflow. This is because it is generally desirable to maintain some record of the workflow such as maintaining drafts of documents which include important changes. However, it is also desirable to consolidate the drafts or remove drafts of the documents which are not important to the overall workflow, are redundant, etc.

Conventional systems are not capable of determining relationships between electronic documents included in a document collection. Because of this, it is not possible to identify which electronic documents created during the workflow are important and should be maintained. It is also not possible to determine which electronic documents created during the workflow are unimportant or redundant and should be deleted. As a result, the unimportant documents are maintained in addition to the important documents which is inefficient and unnecessarily consumes storage capacity of the storage devices.

SUMMARY

Techniques and systems are described for generating indications of relationships between electronic documents. In an example, a computing device implements a relationship system process data describing a group of electronic documents and estimate relationships between particular electronic documents included in the group. In order to estimate the relationships, the relationship system groups text included in electronic documents included in the group into segments of text such as paragraphs or sentences.

The segments are compared to identify pairs of electronic documents that have at least a threshold number of similar segments in common. The value of the threshold is higher if the electronic documents include a relatively large amount of text and the value of the threshold is lower if the electronic document include a relatively small amount of text. The relationship system determines a subset of the electronic documents that includes electronic document pairs having the threshold number of similar segments.

For example, the electronic document pairs are classified as related documents or unrelated documents based on semantic similarity. In an example, the relationship system classifies the electronic document pairs using a machine learning model trained on training data to receive a pair of documents as an input and generate an indication of a classification for the pair of documents as an output. The relationship system generates indications of relationships between particular electronic documents included in the subset based at least partially on the electronic document pairs that are classified as related documents.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 4A and 4B illustrate a representation of classifying pairs of electronic documents.

DETAILED DESCRIPTION

Figure 1:
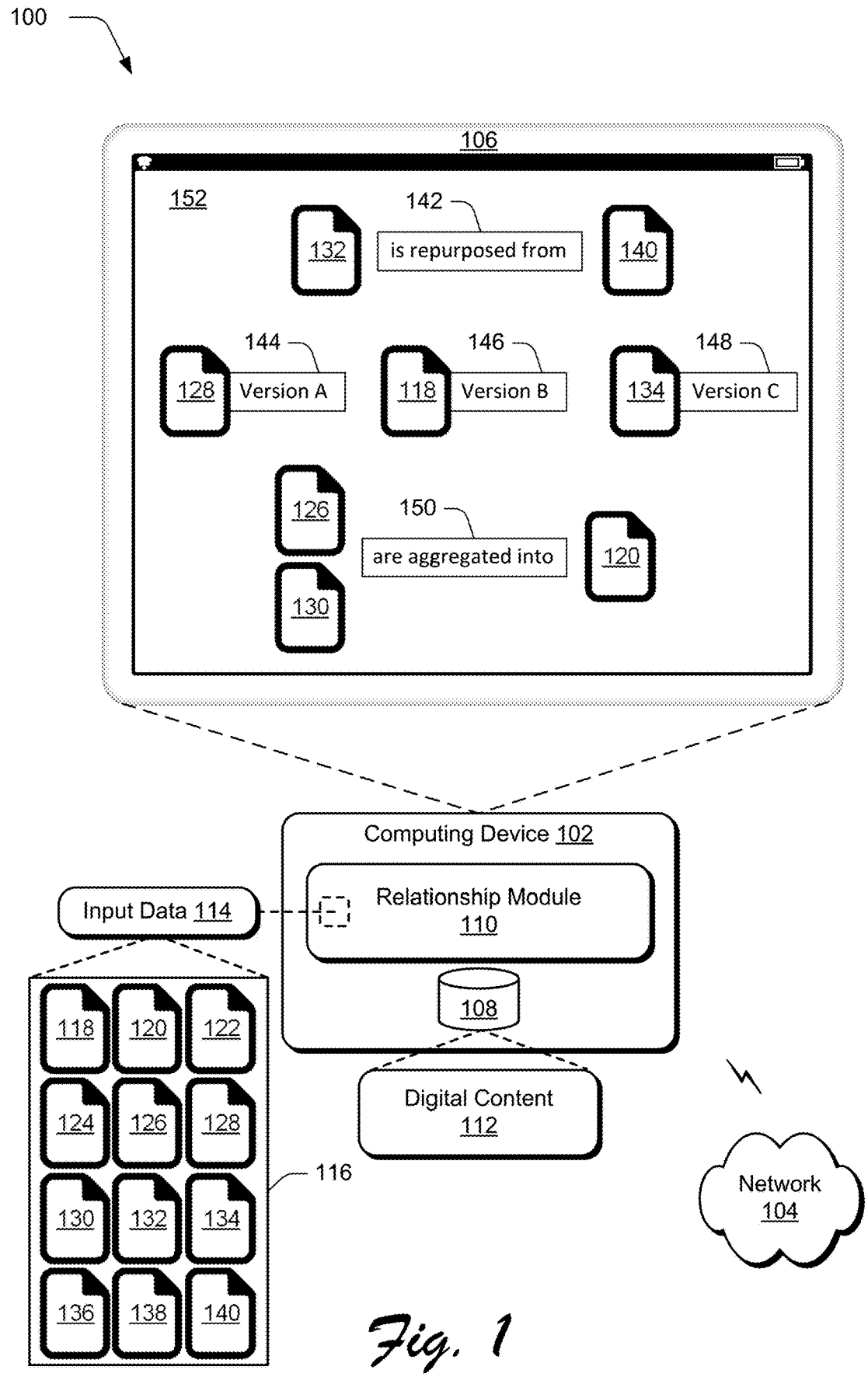
FIG. 1 is an illustration of an environment in an example implementation that is operable to employ digital systems and techniques for generating indications of relationships between electronic documents as described herein.

The process of creating and revising electronic documents typically produces multiple different drafts or versions of the electronic documents. This is especially true for collaborative workflows in which contributing entities create many different versions or drafts of various electronic documents that are typically stored on storage devices of a server system. Upon completion of a workflow, some of the various electronic documents created as part of the workflow are important and should be maintained while other ones of the various documents are unimportant or redundant and should be deleted from the storage devices.

One method for identifying the important/unimportant documents is to consider relationships between the documents. For instance, if two electronic documents have a version relationship, then one of the documents is created by modifying the other document. Depending on a specific context, the original document could be an unimportant document and the modified document might be an important document. If electronic documents included in a set of electronic documents have an aggregate relationship, then one electronic document in the set includes all of the other electronic documents in the set. For example, the one electronic document is an important document. If a pair of electronic documents have a repurposed relationship, then each of the documents generally includes the same subject matter directed towards a different audience. For instance, both of the documents included in the pair are important documents.

However, conventional systems are not capable of determining relationships between electronic documents. As a consequence, it is not possible using these systems to identify which electronic documents stored on the storage devices should be deleted. As a result of this, the unimportant electronic documents are maintained along with the important electronic documents. This is inefficient and consumes excessive storage capacity of the storage devices.

In order to overcome the limitations of conventional systems, techniques and systems are described for generating indications of relationships between electronic documents. In one example, a computing device implements a relationship system to receive input data describing electronic documents included in a document corpus. The relationship system segments text included in each of the electronic documents into segments such as paragraphs or sentences.

For instance, the relationship system determines a hash value for each of the segments and maps the hash values and corresponding segments into bins or buckets using clustering and/or data sketching techniques such as MinHash locality sensitive hashing. The MinHash locality sensitive hashing maps lexically similar segments from the electronic documents into a same bucket such that segments included in a particular bucket include similar words without regard to order. For example, the segments included in the particular bucket are similar based on a bag-of-words similarity.

The relationship system identifies a pair of the electronic documents corresponding to each pair of segments included together in a bucket, and then increments a counter for the pair of the electronic documents. A value of this counter represents a number of similar segments that are included in the pair of the electronic documents. For example, the relationship system computes a containment score for the pair of the electronic documents by normalizing the value of the counter by a number of segments included in a shortest document of the pair of the electronic documents.

The relationship system computes a containment score for each pair of the electronic documents that have a similar segment in common. For instance, the relationship system compares the containment scores to a containment threshold and includes pairs of the electronic documents having containment scores greater than the containment threshold in a subset of the electronic documents. This subset includes pairs of the electronic documents that are likely related.

In one example, the relationship system classifies the pairs of the electronic documents included in the subset as related documents or unrelated documents using a machine learning model (e.g., a fully convolutional network) trained on training data to receive a pair of documents as an input an generate an indication of a classification for the pair of documents as an output. For instance, relationship system represents the pairs of the electronic documents as two heatmaps in a feature space. One of the two heatmaps is generated based on lexical similarity between sentences included in the pairs of the electronic documents. The other heatmap is generated based on Jaccard similarity between entities included in the sentences.

In one example, the fully convolutional network classifies the pairs of the electronic documents included in the subset by processing the heatmaps. For example, the pairs of the electronic documents classified as related documents have a version relationship (e.g., are versions of each other). In this example, the relationship system estimates an order of the versions by forming a first graph having a node for each of the electronic documents that has the version relationship.

Nodes of the graph are connected with weighted edges determined based on insertions and deletions of text in the electronic documents that correspond to the nodes. The relationship system determines a maximum spanning tree from the first graph and uses the maximum spanning tree to estimate an order of versions of the electronic documents that have the version relationship. For example, the maximum spanning tree is a spanning tree for the first graph having a maximum weight. For instance, the relationship system estimates the order of versions of the electronic documents by assuming a smallest electronic document is a root and then performing a topological sorting of the maximum spanning tree.

In order to determine additional relationships, the relationship system uses a hierarchical attention network to generate indications of semantic similarity for the pairs of the electronic documents included in the subset. The hierarchical attention network is trained on training data to receive a pair of documents as an input and generate an indication of semantic similarity for the pair of documents as an output. In one example, the hierarchical attention network is trained based on a cosine similarity triplet loss training objective.

For instance, the relationship system models the indications of semantic similarly for the pairs of the electronic documents included in the subset as an undirected, unweighted second graph. The relationship system executes a community detection algorithm to learn a community structure of the second graph based on approximate modularity optimization. For example, the relationship system infers relationships between the pairs of the electronic documents included in the subset based on the community structure of the second graph and generates indications of relationships between particular electronic documents included in the subset for display in a user interface of a display device.

These relationships include version relationships, aggregation relationship, repurposed relationships, similarity relationships, and so forth. For instance, the relationships are usable to identify important electronic documents and also to identify unimportant or redundant electronic documents which is not possible using conventional systems that are not capable of determining relationships between electronic documents. Moreover, the described systems are capable of generating indications of relationships between electronic documents based only on text included in the electronic documents which is also not possible using conventional systems.

Consider a few examples of functionality made possible by the described systems which is not possible in conventional systems. For example, the described systems are capable of identifying a particular version of an electronic document (e.g., a most recent version of the electronic document) from a set of hundreds or thousands of versions of the electronic document automatically and without user intervention. Conventional systems are limited to identifying the particular version of the electronic document manually (e.g., by comparing the hundreds or thousands of the versions) which is inefficient. By identifying the particular version of the electronic document automatically, the described systems significantly increase efficiency of electronic document version identification relative to conventional systems. In another example, the described systems are usable to augment or improve functionality of other systems. In one example, the described systems improve functionality of a document recommendation system by ensuring that documents recommended by the recommendation system do not include documents that are outdated or superseded which is also not possible using conventional systems.

In addition to the technical advantages described above, the containment scores are also usable to quantify how much of one electronic document is included in another electronic document. For example, if a containment score for two documents indicates that a first document is entirely included in a second document, then only the second document is needed to represent the two documents. In another example, if a containment score for the second document and a third document indicates that the second document is entirely included in the third document, then only the third electronic document is needed to represent all three electronic documents. Consider examples in which the containment scores are leverageable to provide further technological improvements relative to conventional systems. For example, the containment scores are usable to identify redundant electronic documents stored on a storage device which are flagged for deletion to increase available storage capacity of the storage device. In another example, the containment scores are usable by the document recommendation system as part of ensuring that recommendations do not include the documents that are outdated or superseded. In an additional example, the containment scores are usable to increase efficiency of electronic document review processes by indicating that specific documents are included in documents that have already been reviewed such that reviewing the specific documents is avoidable.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a relationship module 110. The storage device 108 is illustrated to include digital content 112. Examples of digital content 112 include digital images, digital videos, digital audio, electronic documents, etc.

The relationship module 110 is illustrated as having, receiving, and/or transmitting input data 114 that describes a document corpus 116. As shown, the document corpus 116 includes electronic documents 118-140. For example, the electronic documents 118-140 are PDF documents, HTML documents, Word documents, and so forth. The relationship module 110 processes the input data 114 to generate indications 142-150 of relationships between the electronic documents 118-140 which are rendered in a user interface 152 of the display device 106.

To do so in one example, the relationship module 110 segments text included in each of the electronic documents 118-140 into segments. In some examples, the segments are paragraphs of the text but in other examples the relationship module 110 is capable of segmenting the text included in each of the electronic documents 118-140 into segments which contain more text (e.g., pages) or which contain less text (e.g., sentences). The relationship module 110 computes a hash value for each of the segments using a hash function. For example, the relationship module 110 computes the hash values for the segments using MinHash and maps the hash values into bins or buckets using locality sensitive hashing (e.g., based on approximate Jaccard similarity).

For instance, the MinHash locality sensitive hashing maps similar paragraphs or segments from the electronic documents 118-140 into a same bucket such that two paragraphs corresponding to two hash values included in a particular bucket are lexically similar, for example, the two paragraphs include similar words without regard to order. In one example, the two paragraphs are similar in terms of a bag-of-words similarity. After performing the MinHash locality sensitive hashing, the relationship module 110 identifies paragraphs or segments corresponding to hash values that are included in each of the buckets.

For each pair of segments identified as being included together in a bucket, the relationship module 110 identifies a corresponding pair of the electronic documents 118-140 and increments a counter for the corresponding pair of the electronic documents 118-140. Consider an example in which electronic document 118 and electronic document 120 are identified as each including a paragraph or a segment which is included in a same one of the buckets. In this example, the relationship module 110 determines that the pair of the electronic documents 118, 120 have a similar paragraph and increments a counter for the pair of the electronic documents 118, 120. By incrementing the counter for the pair of the electronic documents 118, 120 in this way, a value of the counter reflects a number of similar paragraphs included in both of the electronic documents 118, 120.

Continuing the previous example, the relationship module 110 generates a containment score by normalizing the counter for the pair of the electronic documents 118, 120 by a length of a shortest one of the electronic documents 118, 120. In an example in which the electronic document 118 is the shortest one of the electronic documents 118, 120, the containment score reflects a percentage of paragraphs included in the electronic document 118 that are also included (e.g., are similar to paragraphs included) in the electronic document 120. If the containment score is greater than a containment threshold, then the relationship module 110 determines that the electronic document 118 is contained within the electronic document 120.

For instance, the relationship module 110 determines a containment score for each pair of the electronic documents 118-140 that have a similar segment or paragraph in common. Consider an example of how the relationship module 110 leverages the containment scores to determine a subset of the electronic documents 118-140 that are likely related. For example, if the electronic document 120 includes multiple ones of the electronic documents 122-140 in addition to the electronic document 118, and if the electronic document 118 and the multiple ones of the electronic documents 122-140 do not have significant containment scores (e.g., have containment scores below a threshold score) with other ones of the electronic documents 122-140, then the relationship module 110 determines that that the electronic document 118, the electronic document 120, and the multiple ones of the electronic documents 122-140 are candidates for an aggregation relationship. In one example, an aggregation relationship is a type of relationship in which multiple documents are aggregated into a single document. In this example, the relationship module 110 includes the electronic document 118, the electronic document 120, and the multiple ones of the electronic documents 122-140 in the subset as candidates for the aggregation relationship.

Consider another example in which the electronic document 118 is contained in the electronic document 120 and the electronic documents 118, 120 are not related to any of the other electronic documents 122-140. In this example, the relationship module 110 determines that the electronic documents 118, 120 are candidates for a version relationship. A version relationship is a type of relationship in which a second document is a modified version of a first document. In a first example, the second document is the first document with additional text that is not included in the first document. In a second example, the second document is the first document with some text that is included in the first document removed. In a third example, the second document is the first document with some text that is included in the first document removed and some text that is not included in the first document added. In these examples, the relationship module 110 includes the electronic documents 118, 120 in the subset as candidates for the version relationship.

Consider an example in which the electronic document 120 includes multiple ones of the electronic documents 122-140 in addition to the electronic document 118. In this example, the multiple ones of the electronic documents 122-140 have significant containment scores (e.g., have containment scores above a threshold score) with other ones of the electronic documents 122-140. Accordingly, the relationship module 110 includes the electronic document 118, the electronic document 120, and the multiple ones of the electronic documents 122-140 in the subset as candidates for a version relationship.

In one example, the relationship module 110 segments text of the electronic documents 122-140 into segments. In this example, the relationship module 110 determines electronic document pairs of the electronic documents 122-140 having a number of similar segments that is greater than a threshold number. For example, the relationship module 110 identifies the similar segments using locality sensitive hashing. In this example, the relationship module 110 includes the determine electronic document pairs in the subset of the document corpus 116.

In an example, the subset of the document corpus 116 includes electronic documents 118-122, 126-136, and 140 as candidates for relationships. The relationship module 110 leverages a machine learning model to perform pairwise classification for the electronic documents 118-122, 126-136, and 140 included in the subset. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

For example, the machine learning model is trained on training data to receive a pair of electronic documents as an input and generate an indication of a classification for the pair of electronic documents as an output. Specific examples of the machine learning model include a fully convolutional network, a logistic regression model, and so forth. For instance, the relationship module 110 is capable of implementing the specific examples of the machine learning model in addition to a hierarchical attention network to classify pairs of the electronic documents 118-122, 126-136, and 140.

In an example in which the machine leaning model is a fully convolutional network, the fully convolutional network classifies pairs of the electronic documents 118-122, 126-136, and 140 as related documents or unrelated documents. In another example, the fully convolutional network classifies the pairs of the electronic documents 118-122, 126-136, and 140 as having a version relationship or not having a version relationship. In this example, the fully convolutional network classifies electronic documents 118, 128, and 134 as having a version relationship and the fully convolutional network classifies electronic documents 120, 122, 126, 130, 132, 136, and 140 as not having a version relationship.

In order to estimate an order of the electronic documents 118, 128, and 134 that have the version relationship, the relationship module 110 forms a graph that has a node for each of the electronic documents 118, 128, and 134. For instance, the relationship module 110 connects the nodes of the graph with weighted edges based on version scores. In one example, the relationship module 110 determines weights for the weighted edges of the graph by penalizing insertions and deletions among electronic document pairs 118, 128; 118, 134; and 128, 134. In this example, the relationship module 110 further determines the weights for the weighted edges of the graph by rewarding similarities between sentences included in the electronic document pairs 118, 128; 118, 134; and 128, 134.

The relationship module 110 estimates the order of the electronic documents 118, 128, and 134 by determining a maximum spanning tree from the graph. In this way, the relationship module 110 estimates the order of the electronic documents as being 128, 118, and 134. Accordingly, the relationship module 110 generates indication 144 as "Version A," indication 146 as "Version B," and indication 148 as "Version C." As shown, the relationship module 110 renders the indications 144-148 in the user interface 152 of the display device 106.

In order to identify additional relationships, the relationship module 110 leverages a hierarchical attention network to generate indications of sematic similarity for pairs of the electronic documents 118-122, 126-136, and 140 included in the subset. For example, the hierarchical attention network is trained on training data to receive first and second electronic documents as an input and generate an indication of semantic similarity for the first and second electronic documents as an output. The relationship module 110 processes each unique pair of the electronic documents 118-122, 126-136, and 140 using the hierarchical attention network and generates indications of semantic similarity for the unique pairs of the electronic documents 118-122, 126-136, and 140.

For instance, the relationship module 110 then clusters the electronic documents 118-122, 126-136, and 140 into similarity groups based on the indications of semantic similarity. In an example, the relationship module 110 uses a community detection algorithm to identify the similarity groups. In another example, the relationship module 110 identifies common entities and phrases between each pair of the electronic documents 118-122, 126-136, and 140 that are included in one of the similarity groups.

By analyzing the similarity groups, the relationship module 110 identifies a repurposed relationship between electronic documents 132, 140 and an aggregation relationship between electronic documents 120, 126, 130. For the repurposed relationship, the relationship module 110 determines that the electronic document 132 is repurposed from the electronic document 140. Because of this, the relationship module 110 generates the indication 142 as "is repurposed from" which is displayed in the user interface between the electronic document 132 and the electronic document 140.

For the aggregation relationship, the relationship module 110 determines that the electronic document 126 and the electronic document 130 are aggregated into the electronic document 120. For instance, the electronic documents 126, 130 are contained within the electronic document 120. Accordingly, the relationship module 110 generates the indication 150 as "are aggregated into" which is displayed in the user interface 152 between the electronic documents 125, 130 and the electronic document 120.

Although the relationship module 110 is illustrated as receiving the input data 114 describing the document corpus 116 in the example depicted in FIG. 1, it is to be appreciated that in other examples the relationship module 110 is capable of receiving input data 114 describing a particular electronic document. In these other examples, the relationship module 110 processes the input data 114 to identify other electronic documents that have a relationship with the particular document. For example, the digital content 112 includes a document corpus 116 and the relationship module 110 processes the digital content 112 to identify the other electronic documents that have a relationship with the particular electronic document. For instance, the relationship module 110 displays indications of the other electronic documents in the user interface 152 of the display device 106.

Although examples of particular relationships between the electronic documents 118-140 are described, the relationship module 110 is not limited to generating indications of these examples. For instance, the relationship module 110 is capable of identifying a similarity relationship between electronic document pairs included in the electronic documents 118-140. For example, the similarity relationship is based on semantic similarity or any other similarity metric. In some examples, the indications of relationships between particular electronic document pairs included in the electronic documents include change summaries, explanations of similarity, relative orderings, and so forth.

Figure 2:
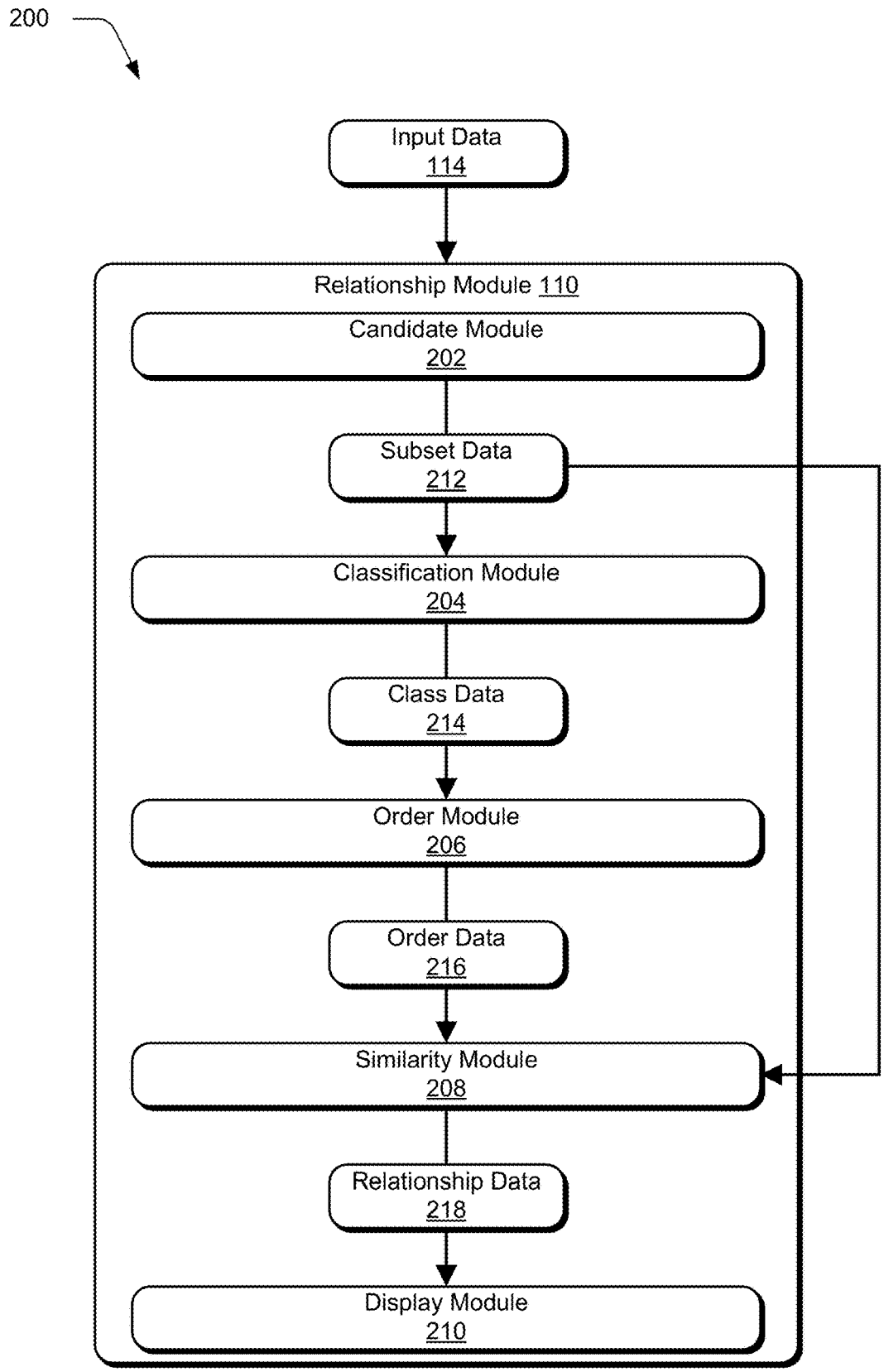
FIG. 2 depicts a system in an example implementation showing operation of a relationship module for generating indications of relationships between electronic documents.

FIG. 2 depicts a system 200 in an example implementation showing operation of a relationship module 110. The relationship module 110 is illustrated to include a candidate module 202, a classification module 204, an order module 206, a similarity module 208, and a display module 210. As shown, the candidate module 202 receives the input data 114 and processes the input data 114 to generate subset data 212.

Figure 3:
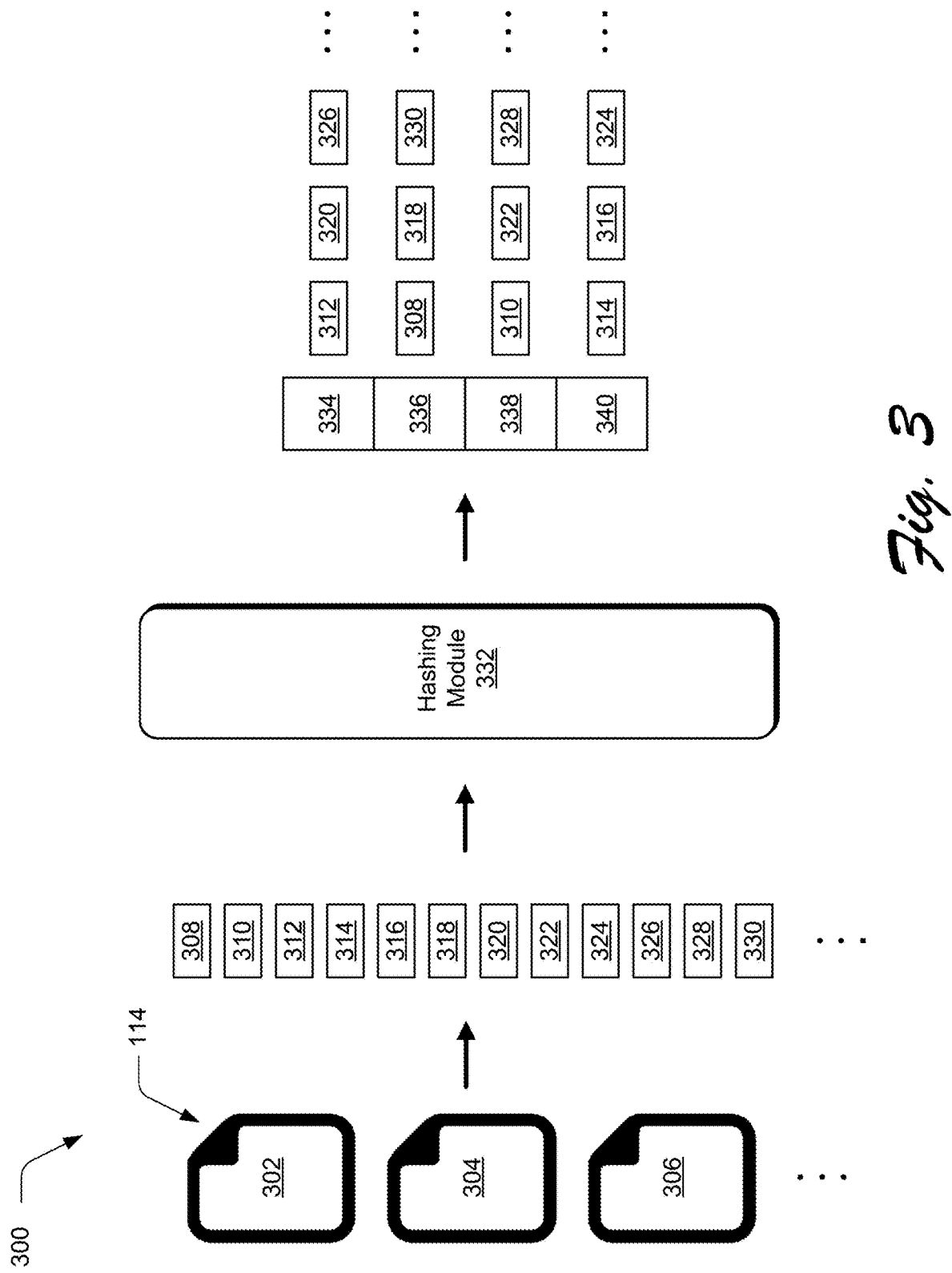
FIG. 3 illustrates a representation of receiving input data describing electronic documents included in a document corpus and determining a subset of the electronic documents.

FIG. 3 illustrates a representation 300 of receiving input data describing electronic documents included in a document corpus and determining a subset of the electronic documents. The representation 300 includes the input data 114 which describes electronic documents 302-306 included in a document corpus 116. For example, the electronic documents 302-306 include text such as HTML documents, Word documents, PDF documents, etc. The candidate module 202 processes the input data 114 to segment text included in the electronic documents 302-306 into segments 308-330.

In a first example, the segments 308-330 are paragraphs of the text included in the electronic documents 302-306. In a second example, the segments 308-330 are sentences of the text that is included in the electronic documents 302-306. In a third example, the segments 308-330 are pages of the text included in the electronic documents 302-306. For example, the candidate module 202 segments electronic document 302 into segments 308-314; the candidate module 202 segments electronic document 304 into segments 316-322; and the candidate module 202 segments electronic document 306 into segments 324-330.

As shown in FIG. 3, the candidate module 202 includes a hashing module 332. For instance, the candidate module 202 implements the hashing module 332 to compute a hash value for each of the segments 308-330. In an example, the hashing module 332 computes the hash values for the segments 308-330 using MinHash and then maps the computed hash value for each of the segments 308-330 into buckets or bins 334-340 using locality sensitive hashing (e.g., based on approximate Jaccard similarity). In this example, segments 308-330 corresponding to hash values included in a particular bucket 334-340 are lexically similar and include similar words without regard to word order.

In the illustrated example, bucket 334 includes segments 312, 320, and 326; bucket 336 includes segments 308, 318, and 330; bucket 338 includes segments 310, 322, and 328; and bucket 340 includes segments 314, 316, and 324. For each pair of the segments 308-330 identified as being included together in one of the buckets 334-340, the candidate module 202 identifies a corresponding pair of the electronic documents 302-306 and increments a counter for the corresponding pair of the electronic documents 302-306. For instance, the bucket 334 includes the segment 312 which is from the electronic document 302 and the bucket 334 also includes the segment 320 which is from the electronic document 304. Based on this, the candidate module 202 increments a counter for the pair of electronic documents 302, 304 by one.

Similarly, the bucket 334 also includes the segment 326 which is from the electronic document 306. Based on the pair of segments 312, 326, the candidate module 202 increments a counter for the pair of electronic documents 302, 306 by one. For example, based on the pair of segments 320, 326, the candidate module 202 increments a counter for the pair of electronic documents 304, 306 by one. By incrementing the counter for the pair of electronic documents 304, 306 in this way, the candidate module 202 ensures that a value of the counter represents a number of the segments 308-330 that are similar and that are included in both the electronic document 304 and the electronic document 306.

Consider an example in which the candidate module 202 increments the value of the counter for the pair of electronic documents 304, 306 from zero to one based on identifying the pair of segments 320, 326 in the bucket 334. In this example, the candidate module 202 increments the counter again (e.g., from one to two) because the bucket 336 includes the segment 318 which is from the electronic document 304 and the bucket 336 also includes the segment 330 which is from the electronic document 306. Similarly, the candidate module 202 increments the counter for the pair of electronic documents 304, 306 from two to three because the segments 322, 328 are included in the bucket 338. Finally, the candidate module 202 increments the counter from three to four because the segments 316, 324 are included in the bucket 340. Accordingly, in this example the value of the counter for the pair of electronic documents 304, 306 is equal to four which is the number of similar segments that are included in both the electronic document 304 and the electronic document 306.

The candidate module 202 leverages the counters to generate a containment score for each of the corresponding pairs of the electronic documents 302-306. To do so in one example, the candidate module normalizes the counters for the corresponding pairs of the electronic documents 302-306 by a length of a shortest one of the electronic documents 302-306 included in each of corresponding pairs. In one example, this is representable as:

$$C(A, B) = \frac{|s(A) \cap s(B)|}{|s(B)|}$$

where: C(A, B) represents a containment score for electronic document B within electronic document A; s(A) represents a set of segments included in the electronic document A; s(B) represents a set of segments included in the electronic document B; |s(B)| represents a size of the set of segments included in the electronic document B; and s(A)∩s(B) represents a set of segments from electronic document A and from electronic document B which are similar based on the MinHash locality sensitive hashing.

The candidate module 202 computes containment scores for each of the electronic document pairs 302, 304; 302, 306; and 304, 306 and compares the containment scores to a containment threshold to determine a subset of the electronic documents 302-306 that are likely related. For example, the containment scores reflect a normalized amount of text of a first document that is similar to text included in a second document. The candidate module 202 compares the containment scores to the containment threshold to determine if the normalized amount of the text of the first document that is similar to the text included in the second document is significant enough to indicate that the first and second documents likely have a version relationship (e.g., the second document is likely a modified version of the first document). For instance, the candidate module 202 includes pairs of the electronic documents 302-306 in the subset if corresponding containment scores for the pairs are greater than the containment threshold. The candidate module 202 generates the subset data 212 as describing the subset of the electronic documents 302-306.

Figure 4B:
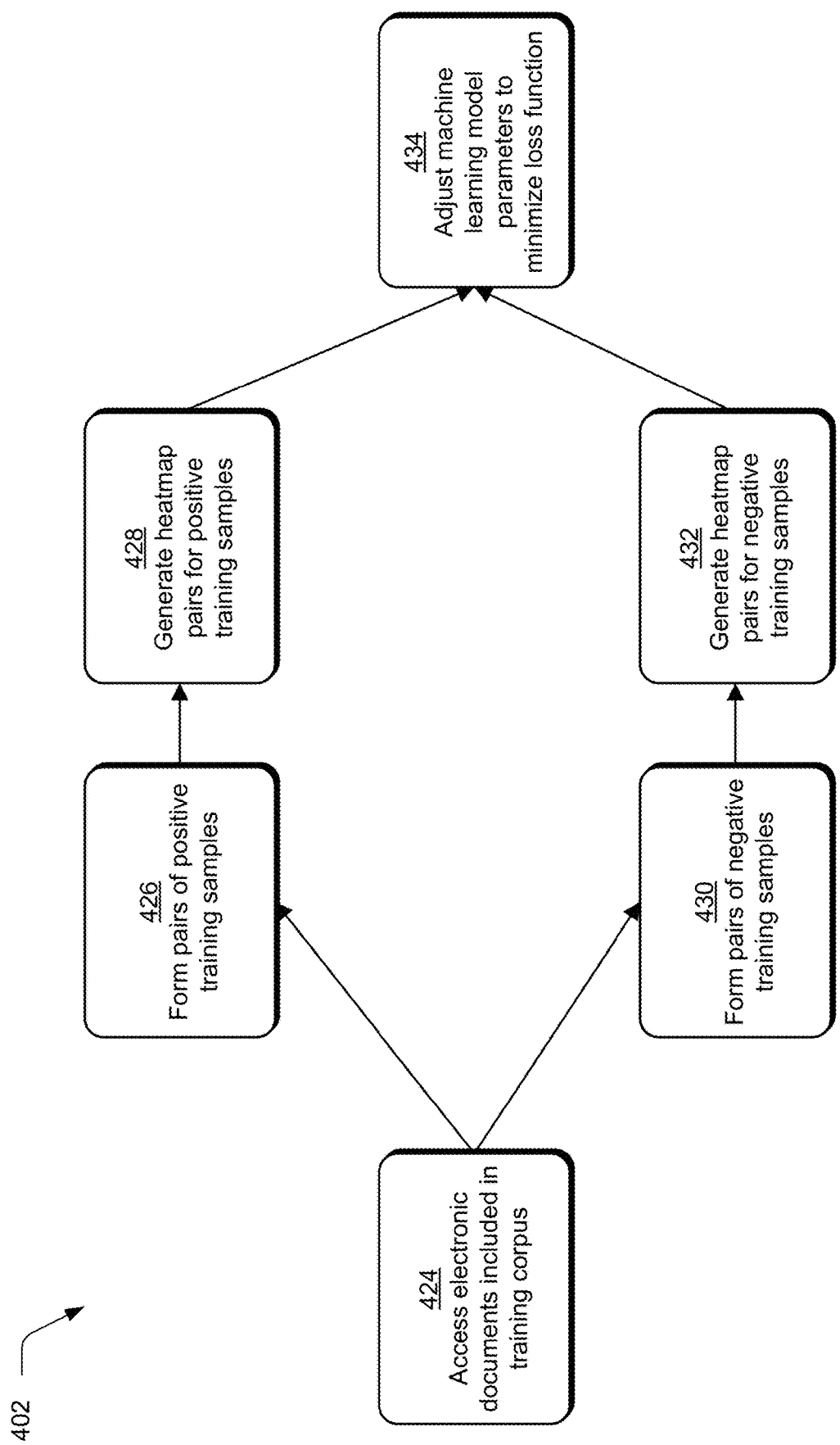

The classification module 204 receives that subset data 212 and processes the subset data 212 to generate class data 214. FIGS. 4A and 4B illustrate a representation of classifying pairs of electronic documents. FIG. 4A illustrates a representation 400 of classifying pairs of electronic documents using a trained fully convolutional network. FIG. 4B illustrates a representation 402 of training the fully convolutional network. As shown, the representation 400 includes the subset data 212 that describes the subset of the electronic documents 302-306. In the illustrated example, the subset data 212 describes electronic documents 404-408 as candidates for having a version relationship.

A pair of the electronic documents 404-408 have a version relationship if one electronic document of the pair is created by modifying the other electronic document of the pair. In one example, a second version of an electronic document is created by adding text to a first version of the electronic document. In another example, the second version of the electronic document is created by removing text from the first version of the electronic document.

For example, the classification module 204 performs pairwise classification of the electronic documents 404-408 using a logistic regression classifier or another trainable classifier model capable of learning to classify pairs of the electronic documents 404-408 as having a version relationship or not having a version relationship. First, the classification module 204 represents the pairs of the electronic documents 404-408 in a feature space suitable for processing using a trained classification model. For instance, the classification module 204 represents the electronic document pair 404, 406 as heatmaps 410, 412.

To do so, the classification module 204 models sentence level similarity between the electronic document 404 and the electronic document 406. In one example, this is representable as a two-dimensional feature vector:

$\langle S_{ij}^{lex}, S_{ij}^{ent} \rangle$ where: $S_{ij}^{lex}$ models lexical similarity between sentence i of a first electronic document and sentence j of a second electronic document using a sentence level tf-idf argument; and $S_{ij}^{ent}$ models Jaccard similarity between entities included in sentence i of the first electronic document and sentence j of the second electronic document.

For instance, the classification module 204 generates heatmap 410 for the electronic document pair 404, 406 using $S_{ij}^{lex}$ and generates heatmap 412 for the electronic document pair 404, 406 using $S_{ij}^{ent}$. Similarly, the classification module 204 generates heatmap 414 for electronic document pair 406, 408 using $S_{ij}^{lex}$ and generates heatmap 416 for the electronic document pair 406, 408 using $S_{ij}^{ent}$.

In the example in which the classification module 204 performs a pairwise classification on the electronic documents 404-408 using the logistic regression classifier, the classification module 204 derives features from the heatmaps 410-416 as inputs to the logistic regression classifier. This is because the logistic regression classifier is not capable of processing the heatmaps 410-416 directly. In the illustrated example, the classification module 204 includes a fully convolutional network module 418 which includes a fully convolutional network. In this example, classification module 204 implements the fully convolutional network module 418 to classify the electronic document pair 404, 406 using the heatmaps 410, 412. Similarly, the classification module 204 implements the fully convolutional network module 418 to classify the document pair 406, 408 using the heatmaps 414, 416.

In one example, the classification module 204 trains the fully convolutional network directly on two-channel heatmaps, for example, one channel for $S_{ij}^{lex}$ and the other channel for $S_{ij}^{ent}$. For example, the classification module 204 forms a dataset from versions of webpages such as from Wikipedia pages treated as documents. For instance, the classification module 204 forms positive training samples using two versions of a same webpage and forms negative training samples using a version of two different webpages.

Although in some examples, the fully convolutional network includes both encoders and decoders, in other examples the fully convolutional network includes an encoder which compresses the heatmaps 410-416 into feature vectors that are then used for binary classification. Since the electronic documents 404-408 are of various sizes, the heatmaps 410-416 have different aspect ratios but the fully convolutional network is robust to the dimensions of the heatmaps 410-416. The encoder is configured to receive a fixed image size (e.g., 200×200), so the classification module 204 pads unused portions of an input image with zeros. If an input has a length larger than an expected length in any dimension, the classification module 204 max pools the input into the expected size (e.g., 200×200).

After the fully convolutional network is trained on the training data to receive a pair of documents as an input and generate an indication of a classification for the pair of documents as an output, the classification module 204 implements the fully convolutional network module 418 to process the heatmaps 410, 412 for the electronic document pair 404, 406 and generate an indication 420 of a classification for the electronic document pair 404, 406. Similarly, the classification module 204 implements the fully convolutional network module 418 to process the heatmaps 414, 416 for the electronic document pair 406, 408 and generate an indication 422 of a classification for the electronic document pair 406, 408.

As shown in FIG. 4A, the indication 420 indicates that the electronic documents 404, 406 have a version relationship. Thus, the electronic document 404 is created by modifying the electronic document 406 or the electronic document 406 is created by modifying the electronic document 404. The indication 422 indicates that the electronic documents 406, 408 do not have a version relationship. The classification module 204 generates the class data 214 as describing pairs of the electronic documents 404-408 classified as having a version relationship which includes the electronic documents 404, 406 based on the indication 420. The order module 206 receives the class data 214 and processes the class data 214 to generate order data 216.

With reference to FIG. 4B, the representation 402 depicts example steps in training the fully convolutional network to classify pairs of the electronic documents 404-408. Electronic documents included in a training corpus are accessed (block 424). For example, the training corpus includes the dataset of the versions of webpages such as from Wikipedia pages treated as documents. Pairs of positive training samples are formed (block 426). In one example, the pairs of positive training samples include one electronic document which is a version of the other electronic document. Heatmap pairs are generated for positive training samples (block 428). The heatmap pairs for the positive training samples each include a first heatmap generated by modeling lexical similarity between sentences included in the positive training samples and a second heatmap generated by modeling Jaccard similarity between entities of the sentences included in the positive training samples.

Pairs of negative training samples are formed (block 430). For example, the pairs of negative training samples include one electronic document which is a version of a first document and one electronic document which is a version of a second document. Heatmap pairs are generate for negative training samples (block 432). In an example, the heatmap pairs for the negative training samples each include a first heatmap generated by modeling lexical similarity between sentences included in the negative training samples and a second heatmap generated by modeling Jaccard similarity between entities of the sentences included in the negative training samples.

Machine learning model parameters are adjusted to minimize a loss function (block 434). In one example, the machine learning model parameters are parameters of a fully convolutional network. In this example, the fully convolutional network is trained on the heatmap pairs for positive training samples and on the heatmap pairs for negative training samples to classify pairs of the electronic documents 404-408. For example, the parameters of the fully convolutional network are adjusted based on the positive training samples and the negative training samples to minimize the loss function. For instance, by minimizing the loss function, the fully convolutional network learns to classify instances of the positive training samples as having a version relationship and to classify instances of the negative training samples as not having a version relationship.

Figure 5:
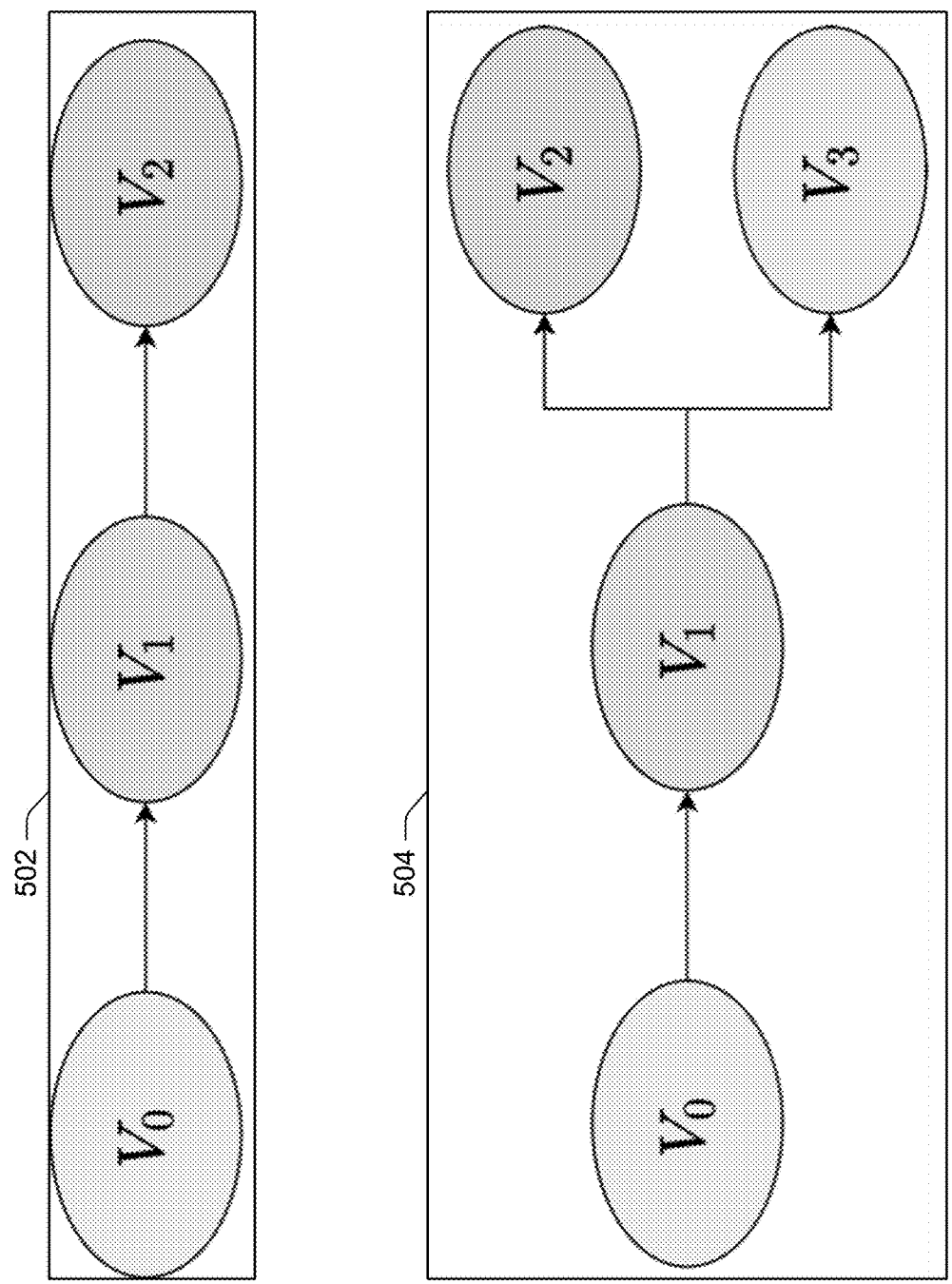
FIG. 5 illustrates a representation of determining an order of versions of electronic documents.

FIG. 5 illustrates a representation 500 of determining an order of versions of electronic documents. As outlined above, the class data 214 describes pairs of the electronic documents 404-408 classified as having a version relationship. In order to determine an order of the document versions, the order module 206 infers that the electronic documents 404-408 include iterative document versions 502 and repurposed document versions 504. As shown in FIG. 5, the iterative document versions 502 include an initial document version $V_0$ that is modified into a first document version $V_1$ which is modified into a second document version $V_2$. In the repurposed document versions 504, the initial document version $V_0$ is modified into the first document version $V_1$ which is modified into the second document version $V_2$ and also a third document version $V_3$. For example, the second document version $V_2$ and the third document version $V_3$ are generated for different audiences.

The order module 206 forms a graph that includes a node for each electronic document described by the class data 214. The order module 206 connects the nodes of the graph with edges having weights based on a version score for electronic documents corresponding to the connected nodes. In one example, this representable as:

$$V = S - \lambda_1 * I - \lambda_2 * D$$

where: V is a version score between a first electronic document and a second electronic document; S is an alignment score between the first electronic document and the second electronic document; I represents a number of sentence insertions; D represents a number of sentence deletions; and $\lambda_1$ and $\lambda_2$ are hyperparameters.

In order to compute S, I, and D, the order module 206 constructs a heatmap M of sentence-level similarity by taking a linear combination of heatmaps that capture lexical ($S_{ij}^{lex}$) and entity-based ($S_{ij}^{ent}$) overlap. For the electronic document pair 404, 406, this is a linear combination of the heatmaps 410, 412. To compute S, the order module 206 uses a Dynamic Programming algorithm over the matrix M to find a maximum possible reward to go from index (0, 0) to index (m, n) which is representable as:

$$S_{ij} = (S_{ij}^{lex} + \lambda_3 S_{ij}^{ent})$$

where: $S_{ij}$ represents overall similarity between sentence i of the first electronic document and sentence j of the second electronic document; m and n are a number of sentences in the first and the second electronic documents, respectively; and $\lambda_3$ is a hyperparameter.

At each element of the matrix M, there are three possible options: (1) move diagonally with reward $R_d=S_{ij}$ (corresponding to a sentence being modified from sentence i of the first electronic document to sentence j of the second electronic document); (2) move horizontally with reward $R_h=-1$ (corresponding to deleting a sentence from the first electronic document and counted in D); or (3) move vertically with reward $R_v$ (corresponding to inserting a sentence in the second electronic document and counted in I). A goal of this approach is to quantify an extent of alignment between the first electronic document and the second electronic document based on a minimum number of transformations required to convert the first electronic document to the second electronic document by finding a highest reward traversed path from the index (0, 0) to the index (m, n). For example, if the first electronic document and the second electronic document are identical, then the highest reward traversed path would lie along a diagonal with all $S_{ij}$ values equal to 1. In this example, if a sentence is j is added to the second electronic document, then the traversal would include horizontal movement. Similarly, if a sentence i is deleted from the first electronic document, then the traversal would include vertical movement.

Accordingly, the order module 206 quantifies the number of sentence insertions I and the number of sentence deletions D as a number of horizontal moves and vertical moves in the traversed path, respectively, which is subtracted from the alignment score S to compute the version score V. In this way, the version score V is representative of a number of transformations needed to convert from one electronic document included in a pair of electronic documents to the other document included in the pair. After computing a version score V for all of the pairs of electronic documents described by the class data 214, the order module 206 completes the graph (which includes a node for each electronic document described by the class data 214) by connecting the nodes with the weighted edges based on the version scores V.

The order module 206 determines a maximum spanning tree (e.g., a spanning tree with weights equal to or greater than a weight of every other spanning tree) from the graph and estimates orders of versions of the electronic documents using the maximum spanning tree. To do so, the order module 206 assumes a smallest electronic document is a root and then performs a topological sorting of the maximum spanning tree. For instance, this topological sorting yields an estimated ordering among electronic documents having a version relationship. The order module 206 generates the order data 216 as describing the estimated ordering among the electronic documents that have the version relationship.

Figure 6:
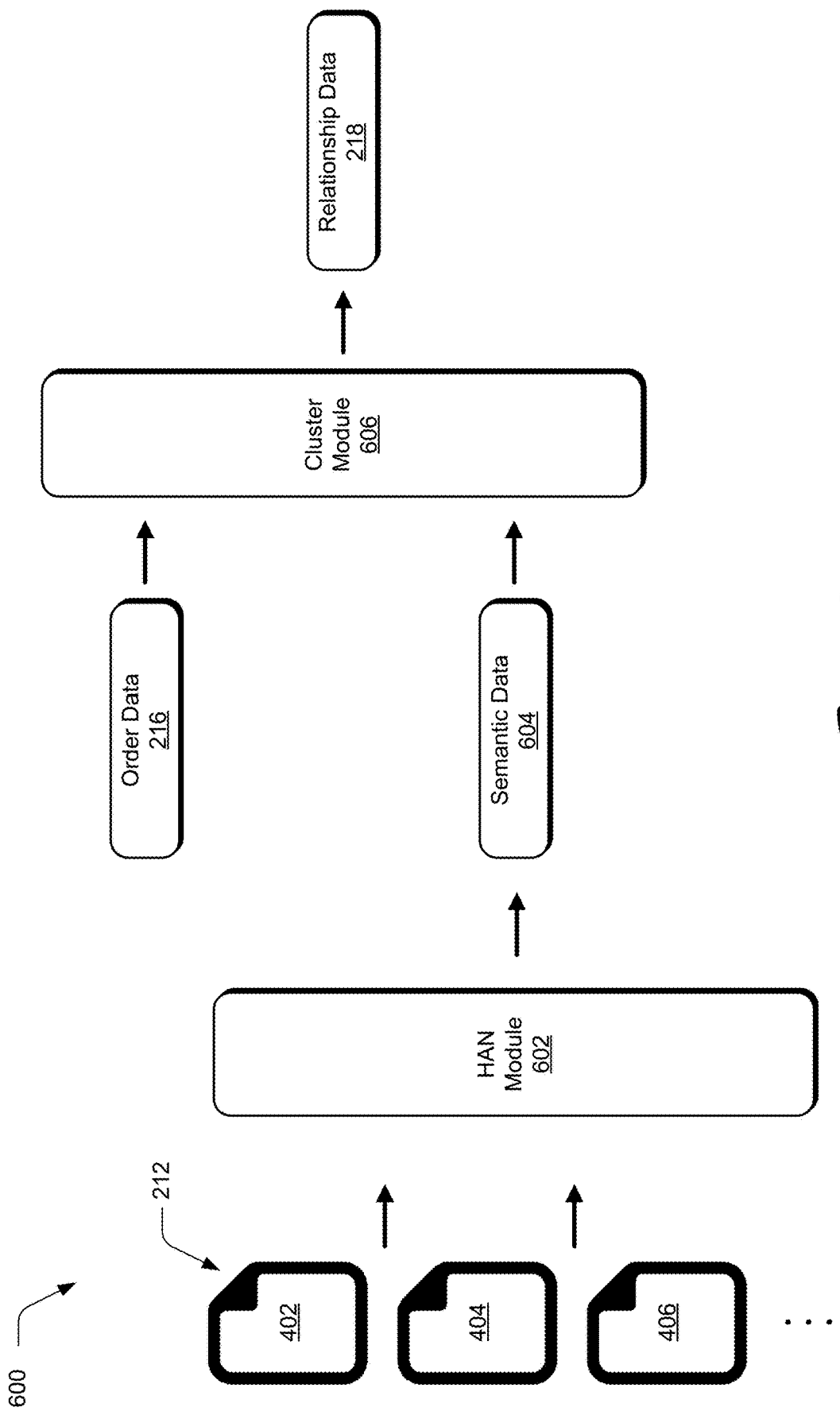
FIG. 6 illustrates a representation of generating relationship data.

As shown in FIG. 2, the similarity module 208 receives the order data 216 and the subset data 212 and processes the order data 216 and/or the subset data 212 to generate relationship data 218. FIG. 6 illustrates a representation 600 of generating relationship data 218. The similarity module 208 includes a hierarchical attention network module 602. For instance, the hierarchical attention network module 602 includes a hierarchical attention network.

In an example, the hierarchical attention network includes a word sequence encoder, a word-level attention layer, a sentence encoder, and a sentence-level attention layer. In this example, the hierarchical attention network builds sentence-level representations by aggregating a sequence of feature vectors at a word-level and leverages the sentence-level representations to construct a unified representation scheme for an electronic document. For instance, the hierarchical attention network builds a contextual representation of a word conditioned on a sentence to which the word belongs.

In order to learn semantic similarity for electronic documents, the similarity module 208 trains the hierarchical attention network using document triplets (a, p, n) where a, p, and n are electronic documents and p is more similar to a compared to n. In a first example, the similarity module 208 trains the hierarchical attention network based on a cosine similarity triplet loss training objective which includes a margin hyperparameter that considers relative similarity between a, p and a, n. In a second example, the similarity module 208 trains the hierarchical attention network based on a similarity network induced triplet loss training objective. In this second example, the similarity module leverages a neural network as part of the training that receives two document representation vectors as an input and outputs a real number signifying an extent of similarity between two documents corresponding to the document representation vectors. In other examples, the similarity module 208 trains the hierarchical attention network based on other training objectives such as by defining loss using a Euclidean distance.

As illustrated in the representation 600, the hierarchical attention network module 602 receives pairs of the electronic documents 404-408 described by the subset data 212 as an input and processes the pairs of the electronic documents 404-408 to generate semantic data 604. The semantic data 604 describes indications of semantic similarity for the pairs of the electronic documents 404-408. For a particular pair of the electronic documents 404-408, the hierarchical attention network module 602 first determines contextual representations of words included in the particular pair of the electronic documents 404-408 and then determines contextual representations of sentences included in in the particular pair of the electronic documents 404-408. To derive the contextual representations of the words belonging to a particular sentence, a sequence of tokens included in the particular sentence is passed to bidirectional recurrent neural networks included in the hierarchical attention network module 602.

An output from the bidirectional recurrent neural networks at each sequence index forms a contextual feature representation for a corresponding token. For instance, the contextual representations of the tokens are combined linearly to form a sentence representation. Weights for the linear combination are derived by applying a word attention mechanism to extract words that are important to a meaning of a sentence. The representations of the extracted words are then aggregated into a sentence vector.

For example, sentence embeddings learned in this manner are unaware of context since they are formed from contextual representations of corresponding constituent words included in the particular pair of the electronic documents 404-408. In order to determine a contextual representation for the particular sentence, a window length is selected and sentences included in the window are used for forming the contextual representation for the particular sentence. The similarity module 208 applies a sentence attention mechanism to the sentences included in the window and weights are derived by extracting important sentences from the sentences included in the window based on the sentence attention mechanism.

This is repeated for all sentences included in the particular pair of the electronic documents 404-408. A document representation vector is obtained for the particular pair of the electronic documents 404-408 by linearly combining the sentence contextual representations with the weights derived from the sentence attention mechanism. The hierarchical attention network module 602 generates a document representation vector for each pair of the electronic documents 404-408 described by the subset data 212. For example, the hierarchical attention network module 602 generates the semantic data 604 as describing the document representation vectors.

As shown in FIG. 6, the similarity module 208 includes a cluster module 606 which receives the semantic data 604 and the order data 216 and processes the semantic data 604 and/or the order data 216 to generate the relationship data 218. To do so, the cluster module 606 processes the semantic data 604 and models the document representation vectors described by the semantic data 604 as an undirected, unweighted graph. The cluster module 606 applies a community detection algorithm to learn a community structure of the undirected, unweighted graph based on approximate modularity optimization. Modularity of the graph is a scalar value between −1 and 1 which measures a density of links inside of communities included in the graph as compared to an expected number of links inside the communities.

The cluster module 606 initializes the community detection algorithm by assigning each of the electronic documents 404-408 described by the subset data 212 to a different community within the graph which results in an equal number of the electronic documents 404-408 and the communities. For example, the cluster module 606 leverages the order data 216 when assigning the electronic documents 404-408 to the communities within the graph by processing the order data 216 to identify representative electronic documents. In this example, the cluster module 606 only assigns identified representative electronic documents to the communities within the graph.

In this manner, the cluster module 606 eliminates redundant electronic documents (e.g., other versions of the identified representative documents described by the order data 212) from the electronic documents 404-408 assigned to the communities within the graph. For instance, the cluster module 606 identifies the representative electronic documents as most recent versions of the redundant electronic documents, larger versions of the redundant electronic documents, etc. By identifying the representative electronic documents in this way and then eliminating the redundant electronic documents, the cluster module 606 ensures that the graph is formed without introducing a bias that would otherwise be introduced if the redundant electronic documents are included in the communities within the graph. This is because the redundant electronic documents that are versions of each other are likely to be included within a same community of the graph.

In a first phase, the cluster module 606 moves a first electronic document into a community of a second electronic document and determines whether this change increases modularity of the graph. For example, in the first phase, the cluster module 606 optimizes modularity by only allowing local changes to the communities. In a second phase, the cluster module 606 aggregates the communities into a new network and determines whether the new network increases modularity of the graph. For instance, the cluster module 606 iterates the first phase and the second phase until increasing modularity of the graph is no longer possible. Upon achieving this maximum, the cluster module 606 colors the communities of the graph for visualization and generates the relationship data 218 as describing the graph with optimized modularity.

With respect to FIG. 2, the display module 210 receives the relationship data 218 and processes the relationship data 218 to generate indications of relationships between particular electronic documents included in the subset described by the subset data 212. For instance, the display module 210 generates the indications of the relationships for display in a user interface of a display device such as the user interface 152 of the display device 106. The indications of the relationships indicate version relationships, aggregate relationships, repurposed relationships, and so forth. In an example, the display module 210 models change among the particular electronic documents based on word distributions of differences between the particular electronic documents as part of generating the indications of the relationships. In this example, display module 210 generates the indications of the relationships as including summaries of the differences between the particular electronic documents.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
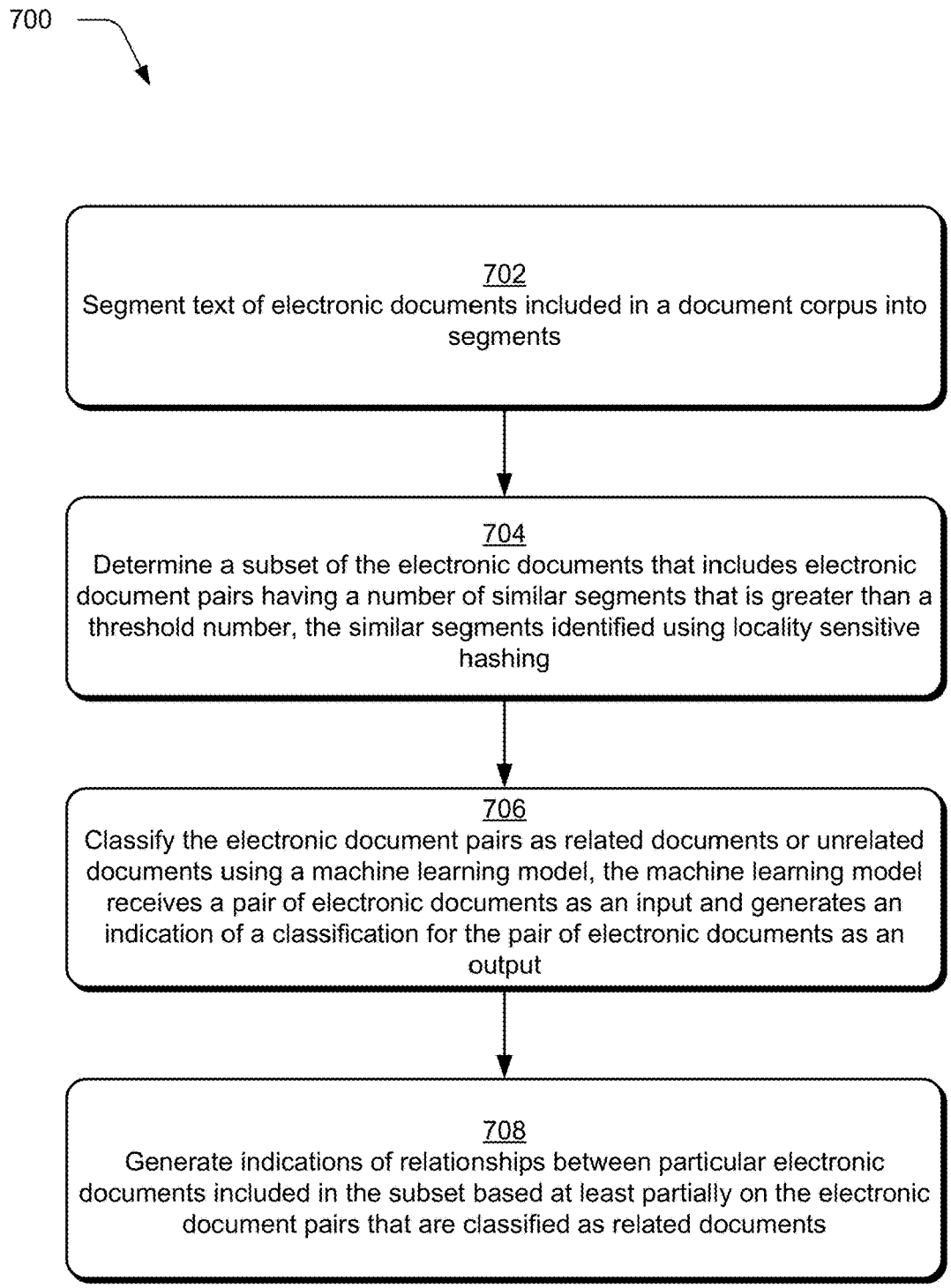
FIG. 7 is a flow diagram depicting a procedure in an example implementation in which text of electronic documents included in a document corpus is segmented into segments and indications of relationships between particular electronic documents are generated.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which text of electronic documents included in a document corpus is segmented into segments and indications of relationships between particular electronic documents are generated.

Text of electronic documents included in a document corpus is segmented into segments (block 702). For example, the computing device 102 implements the relationship module 110 to segment the text into segments. A subset of the electronic documents is determined that includes electronic document pairs having a number of similar segments that is greater than a threshold number (block 704), the similar segments are identified using locality sensitive hashing. In an example, the relationship module 110 determines the subset of the electronic documents that includes the electronic document pairs having the number of the similar segments that is greater than the threshold number.

The electronic document pairs are classified as related documents or unrelated documents using a machine learning model, the machine learning model receives a pair of electronic documents as an input and generates an indication of a classification for the pair of electronic documents as an output (block 706). The computing device 102 implements the relationship module 110 to classify the electronic document pairs as related documents or unrelated documents in one example. Indications are generated of relationships between particular electronic documents included in the subset based at least partially on the electronic document pairs that are classified as related documents (block 708). For example, the relationship module 110 generates the indications of the relationships between the particular electronic documents included in the subset.

Figure 8A:
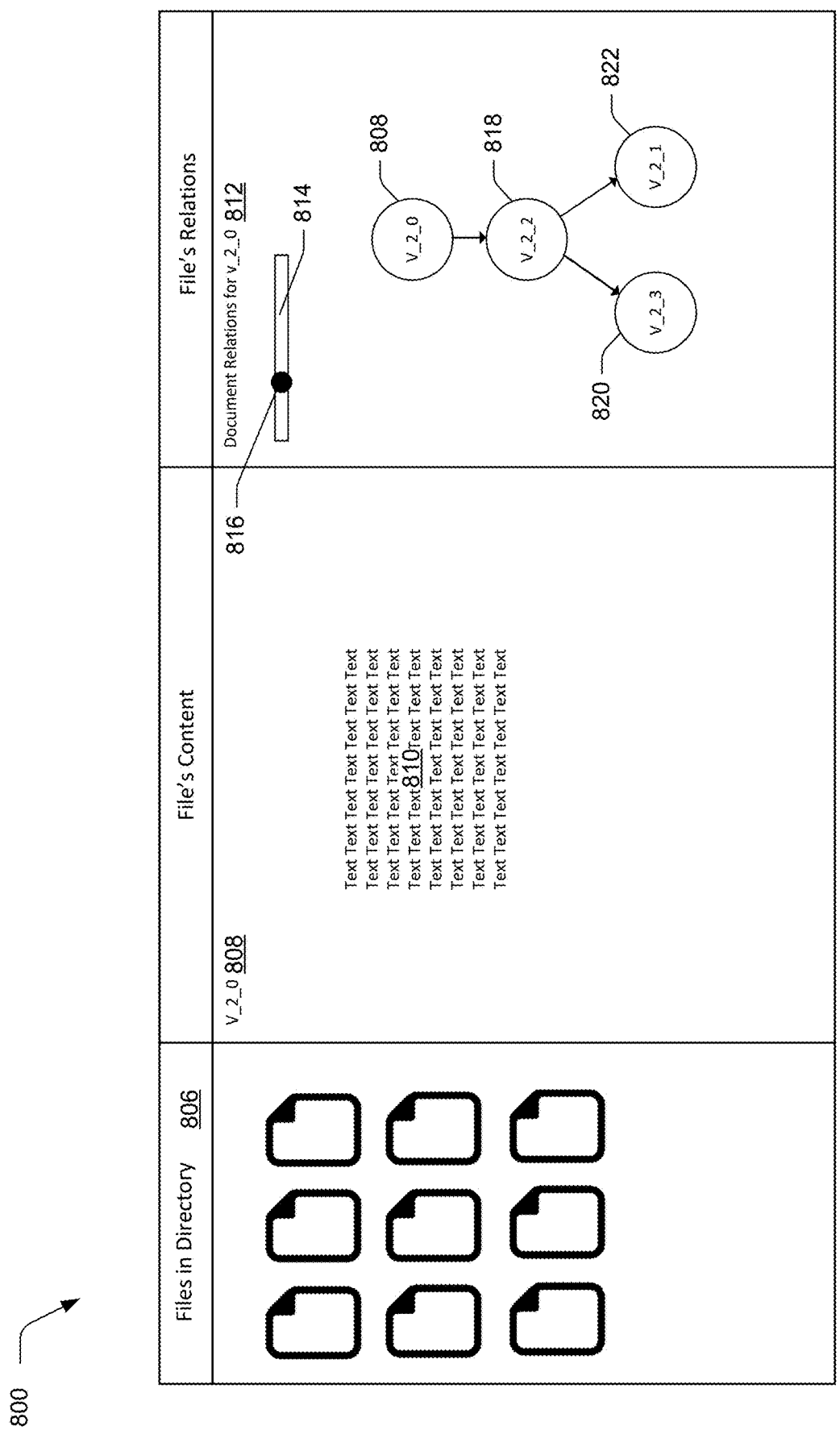
FIGS. 8A, 8B, and 8C illustrate example user interfaces for displaying indications of relationships between electronic documents.
Figure 8B:
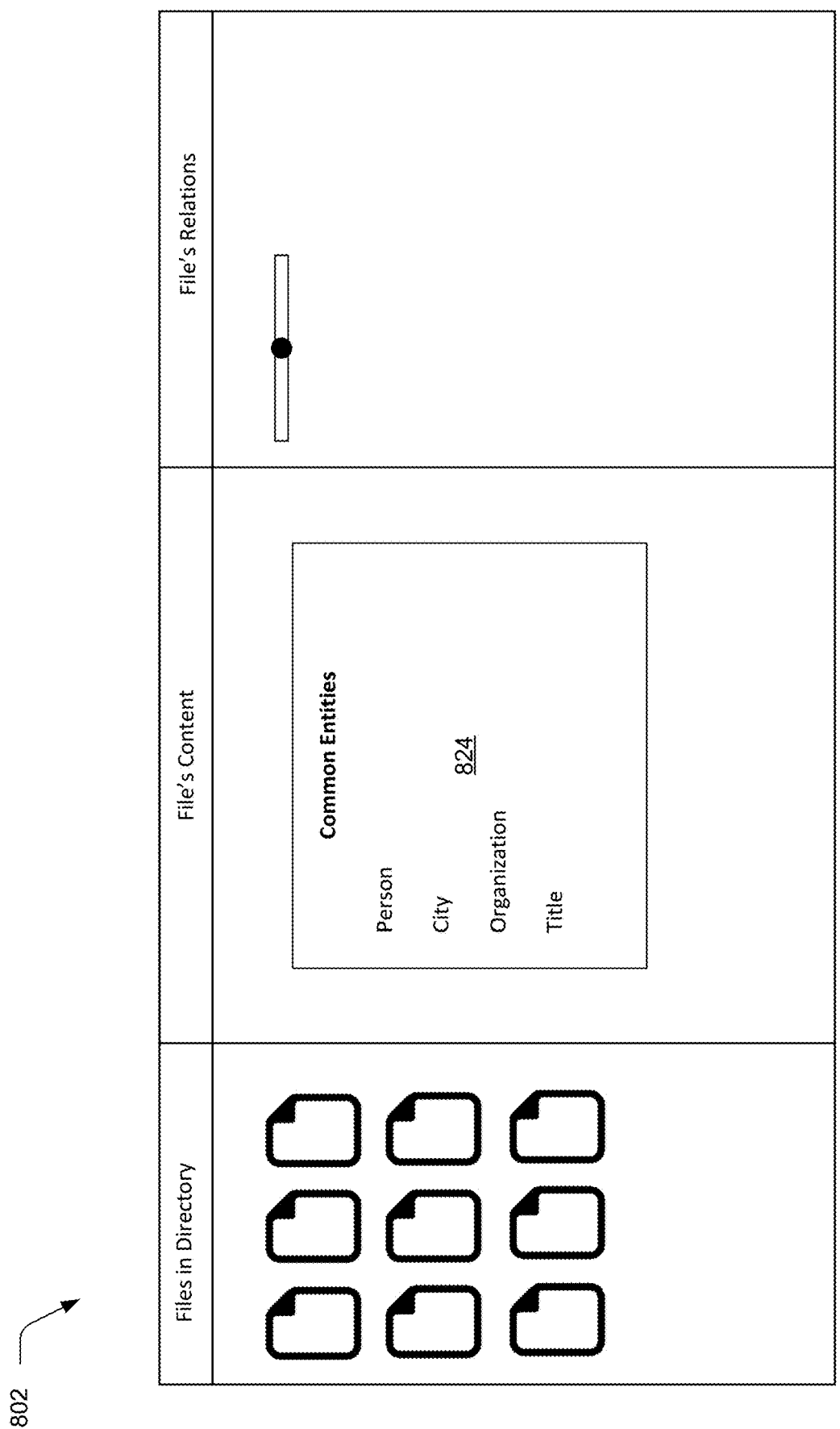
Figure 8C:
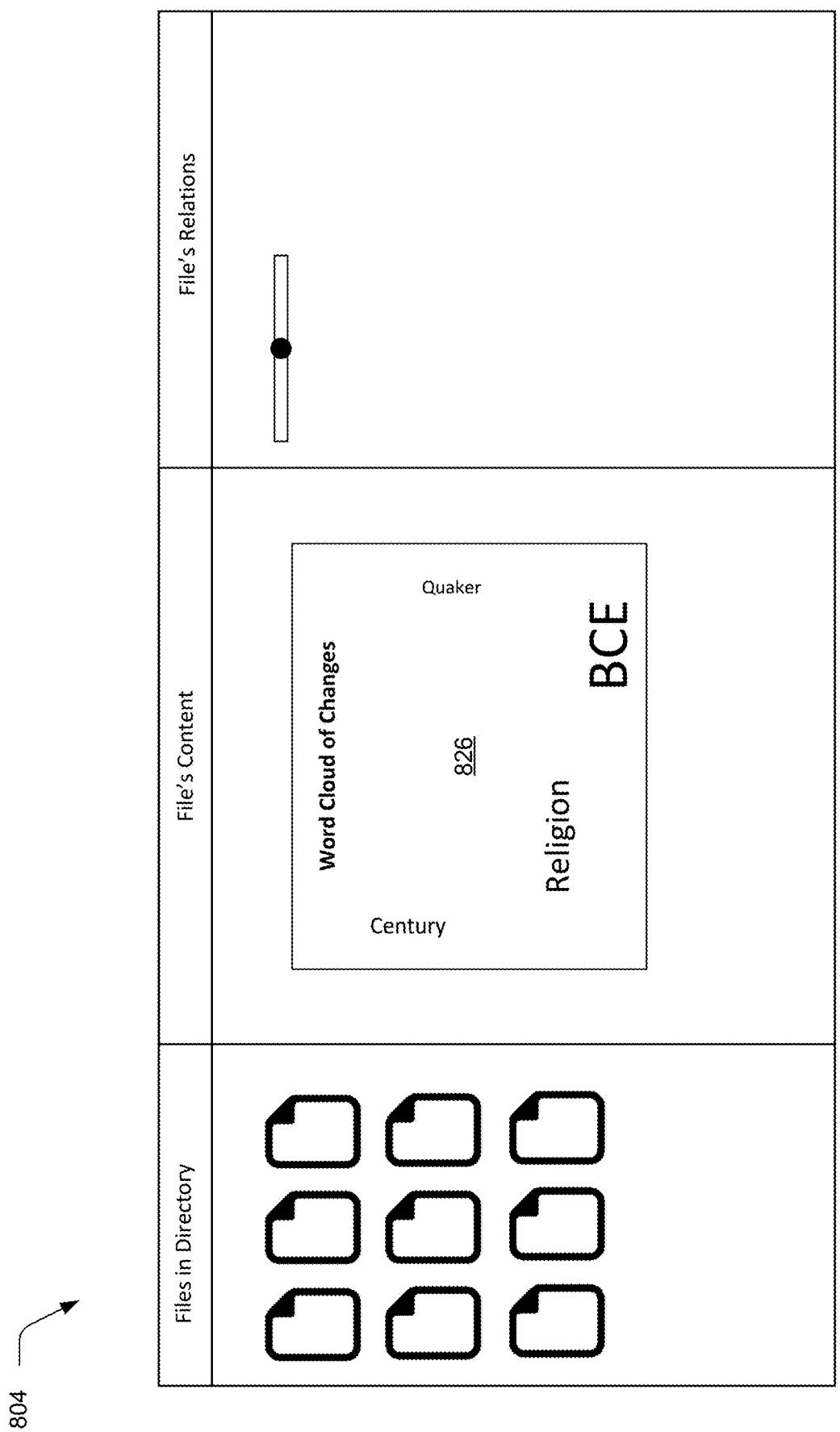

FIGS. 8A, 8B, and 8C illustrate example user interfaces for displaying indications of relationships between electronic documents. FIG. 8A illustrates a representation 800 of example indications of relationships between electronic documents included in a document corpus. FIG. 8B illustrates a representation 802 of an indication of common entities included in text of related electronic documents. FIG. 8C illustrates a representation 804 of an indication of a word cloud of changes identified between versions of electronic documents.

As shown in FIG. 8A, the representation 800 includes a user interface for generating indications of relationships between electronic documents. For example, a user interacts with an input device (a mouse, a stylus, a keyboard, a touchscreen, a microphone, etc.) relative to the user interface to generate and display indications of relationships between electronic documents included in a document corpus. In one example, the user interacts with the input device relative to the user interface to specify the document corpus and the relationship module 110 receives input data 114 describing electronic documents included in the document corpus. In this example, the relationship module 110 processes the input data 114 and generates indications of relationships between particular electronic documents included in the document corpus to display in the user interface.

For example, the relationship module 110 displays indications of the particular electronic documents in a file directory 806 of the user interface. The user manipulates the input device relative to the file directory 806 and interacts with a user interface element corresponding to an electronic document identifier 808 for an electronic document of interest to the user. As shown, the electronic document identifier 808 is displayed as "v_2_0" and the relationship module 110 receives the input data 114 describing the electronic document of interest to the user. In response to receiving the input data 114, the relationship module 110 extracts content from the electronic document of interest to the user and displays the extracted content as text 810 in the user interface.

After reviewing the text 810, the user interacts with the input device relative to a relationship interface 812. As shown, the relationship interface 812 includes an adjustable input field 814 and a user interface element 816. For example, the user manipulates the input device relative to the user interface to interact with the user interface element 816. This interaction changes a value of the adjustable input field 814 which is illustrated to change a sensitivity value.

The sensitivity value defines a manner in which the relationship module 110 identifies electronic documents as being related to the electronic document of interest to the user. For example, increasing the sensitivity value increases a level of confidence that the relationship module 110 uses to infer relationships between the particular electronic documents and the electronic document of interest to the user. In this example, the relationship module 110 generally identifies fewer relationships in response to an increase in the sensitivity value. Similarly, decreasing the sensitivity value decreases the level of confidence that the relationship module 110 uses to infer relationships between the particular electronic documents and the electronic document of interest to the user. Thus, the relationship module 110 generally identifies additional relationships in response to a decrease in the sensitivity value.

For instance, the relationship module 110 receives the input data 114 describing the change in the sensitivity value based on the user's interaction with the user interface element 816. In response to receiving and processing the input data 114, the relationship module 110 generates and displays electronic document identifiers 818-822 of electronic documents that are related to the electronic document of interest to the user. As shown, the electronic document identifier 818 is for a first version of the electronic document of interest to the user that is created by modifying the electronic document of interest to the user. The electronic document identifiers 820, 822 are for a second version of the electronic document of interest to the user and a third version of the electronic document of interest to the user, respectively. For example, both the second version and the third version of the electronic document of interest to the user are created by modifying the first version of the electronic document of interest to the user.

As shown in FIG. 8B, the representation 802 includes an indication 824 of common entities included in the first, second, and third versions of the electronic document of interest to the user. For example, the relationship module 110 displays the indication 824 in response to receiving the input data 114 describing a request to identify the common entities. The representation 804 depicted in FIG. 8C includes an indication 826 of a word cloud of changes between the first, second, and third versions of the electronic document of interest to the user. For instance, the relationship module 110 displays the indication 826 in response to receiving the input data 114 describing a request to determine the word cloud.

By displaying the indications 824, 826, the relationship module 110 communicates how the electronic document of interest to the user is related to the first, second, and third versions of the electronic document of interest to the user. For example, the relationship module 110 communicates this information automatically and without intervention from the user. For instance, the user does not review the first, second, or third versions of the electronic document of interest to the user because the indications 824, 826 summarize the information included in the first, second, and third versions of the electronic document of interest to the user.

Example System and Device

Figure 9:
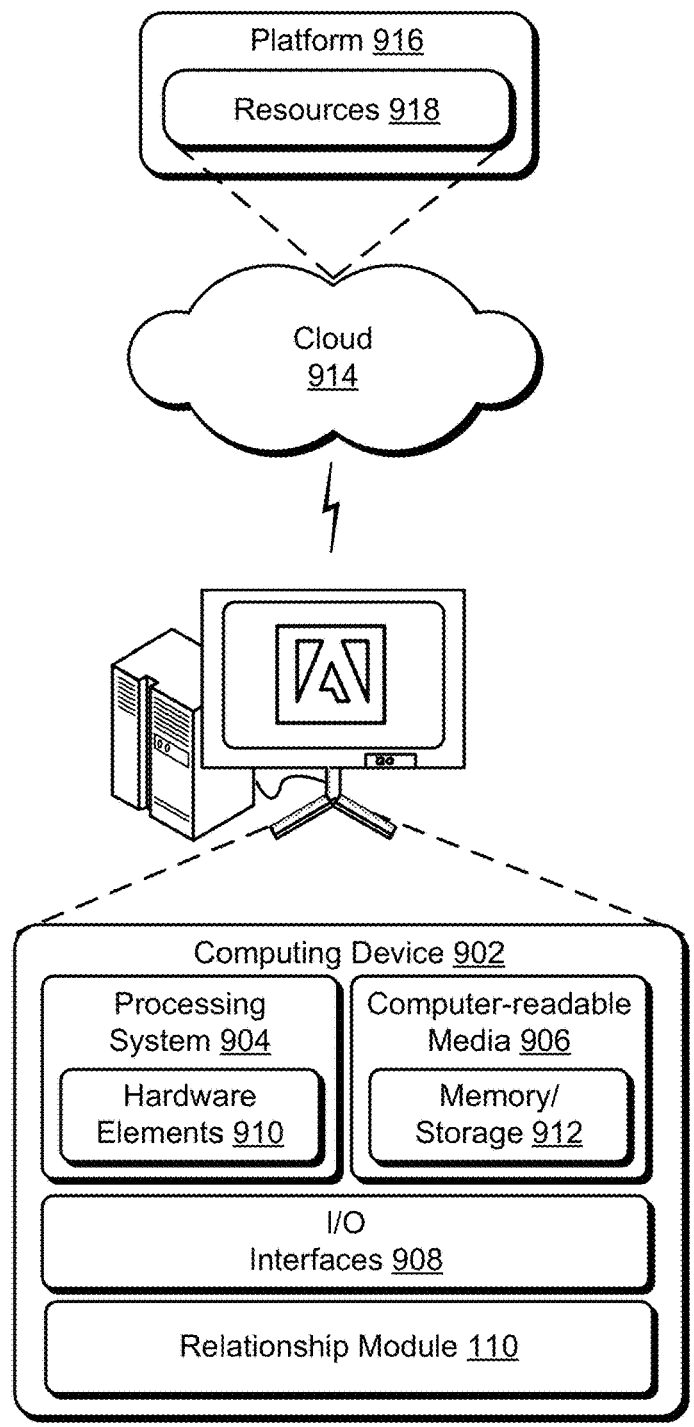
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the relationship module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Although implementations of systems for generating indications of relationships between electronic documents have been described in language specific to structural features and/or methods, it is to be understood that the appended claims are not necessarily limited to the specific features or methods described. Rather, the specific features and methods are disclosed as example implementations of systems for generating indications of relationships between electronic documents, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a processing device, the method comprising:
    segmenting, by the processing device, text of electronic documents included in a document corpus into segments;
    determining, by the processing device, a subset of the electronic documents that includes electronic document pairs having a number of similar segments that is greater than a threshold number, the similar segments identified using locality sensitive hashing;
    classifying, by the processing device and using a machine learning model, the electronic document pairs as semantically similar documents or not semantically similar documents, the machine learning model being used to receive a pair of electronic documents as an input and generate an indication of a classification for the pair of electronic documents as an output;
    computing, by the processing device, containment scores for the electronic document pairs based on the number of the similar segments and a length of a shorter electronic document included in each of the electronic document pairs; and
    generating, by the processing device, indications of relationships between particular electronic documents included in the subset based at least partially on the electronic document pairs that are classified as semantically similar documents and the containment scores.

2. The method as described in claim 1, wherein the relationships between the particular electronic documents include a version relationship, an aggregation relationship, a repurposed relationship, or a similarity relationship.

3. The method as described in claim 1, further comprising determining, by the processing device, a maximum spanning tree from a graph that includes a node for each electronic document included in the electronic document pairs that are classified as semantically similar documents, and the indications of the relationships between the particular electronic documents are generated at least partially based on the maximum spanning tree.

4. The method as described in claim 3, wherein the nodes included in the graph are connected by edges, the edges having weights, and the weights of the edges being based on insertions and deletions in the electronic document pairs that are classified as semantically similar documents.

5. The method as described in claim 1, wherein the machine learning model is trained to classify the electronic document pairs as semantically similar documents or not semantically similar documents using training data that describes two-dimensional heatmaps generated from pairs of electronic document training samples.

6. The method as described in claim 5, wherein the two-dimensional heatmaps include first two-dimensional heatmaps for lexical similarity between the segments that are included in the pairs of the electronic document training samples and second two-dimensional heatmaps for Jaccard similarity between entities included in the segments.

7. The method as described in claim 1, further comprising generating, by the processing device, indications of semantic similarity for electronic documents included in the subset using a hierarchical attention network trained on training data to receive first and second electronic documents as an input and generate an indication of sematic similarity for the first and second electronic documents as an output.

8. The method as described in claim 7, further comprising clustering, by the processing device, the electronic documents included in the subset into similarity groups based on the indications of semantic similarity, and the indications of the relationships between the particular electronic documents are generated at least partially based on the similarity groups.

9. The method as described in claim 1, wherein the indications of the relationships between the particular electronic documents include at least one of a change summary, an explanation of similarity, or a relative ordering between the particular electronic documents.

10. One or more computer-readable storage media comprising instructions stored thereon that, responsive to execution by a processing device, causes the processing device to perform operations including:
    segmenting text of electronic documents included in a document corpus into segments;
    determining a subset of the electronic documents that includes electronic document pairs having a number of similar segments that is greater than a threshold number, the similar segments identified using locality sensitive hashing;

classifying, using a machine learning model, the electronic document pairs as semantically similar documents or not semantically similar documents, the machine learning model being used to receive a pair of electronic documents as an input and generate an indication of a classification for the pair of electronic documents as an output;

computing containment scores for the electronic document pairs based on the number of the similar segments and a length of a shortest electronic document included in each of the electronic document pairs;

forming a graph having a node for each electronic document included in the electronic document pairs that are classified as semantically similar documents;

determining a maximum spanning tree from the graph; and generating indications of relationships between particular electronic documents included in the subset based at least partially on the maximum spanning tree and the containment scores.

11. The one or more computer-readable storage media as described in claim 10, wherein the relationships between the particular electronic documents include at least one of a version relationship, an aggregation relationship, a repurposed relationship, or a similarity relationship.

12. The one or more computer-readable storage media as described in claim 10, wherein the operations further include generating indications of semantic similarity for electronic documents included in the subset using a hierarchical attention network trained on training data to receive first and second electronic documents as an input and generate an indication of sematic similarity for the first and second electronic documents as an output.

13. The one or more computer-readable storage media as described in claim 12, wherein the operations further include clustering the electronic documents included in the subset into similarity groups based on the indications of semantic similarity, and the indications of the relationships between the particular electronic documents are generated at least partially based on the similarity groups.

14. A system comprising:
a processing device; and
computer-readable storage media storing instructions that are executable by the processing system to perform operations including:
segmenting text of electronic documents included in a document corpus into segments;
determining a subset of the electronic documents that includes electronic document pairs having a number of similar segments that is greater than a threshold number, the similar segments identified using locality sensitive hashing;

classifying, using a machine learning model, the electronic document pairs as semantically similar documents or not semantically similar documents, the machine learning model being used to receive a pair of electronic documents as an input and generate an indication of a classification for the pair of electronic documents as an output;

computing containment scores for the electronic document pairs based on the number of the similar segments and a length of a shorter electronic document included in each of the electronic document pairs; and generating indications of relationships between particular electronic documents included in the subset based at least partially on the electronic document pairs that are classified as semantically similar documents and the containment scores.

15. The system as described in claim 14, wherein the relationships between the particular electronic documents include a version relationship, an aggregation relationship, a repurposed relationship, or a similarity relationship.

16. The system as described in claim 14, the operations further including determining a maximum spanning tree from a graph that includes a node for each electronic document included in the electronic document pairs that are classified as semantically similar documents, and the indications of the relationships between the particular electronic documents are generated at least partially based on the maximum spanning tree.

17. The system as described in claim 14, wherein the machine learning model is trained to classify the electronic document pairs as semantically similar documents or not semantically similar documents using training data that describes two-dimensional heatmaps generated from pairs of electronic document training samples.

18. The system as described in claim 17, wherein the two-dimensional heatmaps include first two-dimensional heatmaps for lexical similarity between the segments that are included in the pairs of the electronic document training samples and second two-dimensional heatmaps for Jaccard similarity between entities included in the segments.

19. The system as described in claim 14, wherein the segments are sentences or paragraphs.

20. The method as described in claim 1, wherein the segments are sentences or paragraphs.

* * * * *